United States Patent
Ordas et al.

(10) Patent No.: US 11,218,291 B2
(45) Date of Patent: *Jan. 4, 2022

(54) METHOD AND CIRCUIT FOR PERFORMING A SUBSTITUTION OPERATION

(71) Applicant: STMICROELECTRONICS (ROUSSET) SAS, Rousset (FR)

(72) Inventors: Thomas Ordas, Pourcieux (FR); Yanis Linge, Fuveau (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 279 days.

This patent is subject to a terminal disclaimer.

(21) Appl. No.: 16/281,889

(22) Filed: Feb. 21, 2019

(65) Prior Publication Data

US 2019/0268136 A1 Aug. 29, 2019

(30) Foreign Application Priority Data

Feb. 26, 2018 (FR) ...................................... 1851638
Feb. 26, 2018 (FR) ...................................... 1851644
Feb. 26, 2018 (FR) ...................................... 1851645

(51) Int. Cl.
*H04L 9/06* (2006.01)
*G06F 21/72* (2013.01)

(52) U.S. Cl.
CPC ............ *H04L 9/0618* (2013.01); *G06F 21/72* (2013.01); *H04L 9/0625* (2013.01);
(Continued)

(58) Field of Classification Search
CPC ..... H04L 9/0618; H04L 9/0643; H04L 9/002; H04L 9/0625; H04L 2209/046;
(Continued)

(56) References Cited

U.S. PATENT DOCUMENTS 6,591,415 B1 * 7/2003 Torrubia-Saez ........ G06F 21/10
717/158
9,906,360 B2 * 2/2018 Johnson ................ H04L 9/0631
(Continued)

FOREIGN PATENT DOCUMENTS

EP 3188000 A1 * 7/2017 ............. G06F 7/723
FR 2 985 624 7/2019
KR 20210058228 A * 5/2021

OTHER PUBLICATIONS

Pan et al., You Cannot Hide behind the Mask: Power Analysis on a Provably Secure S-Box Implementation, Information Security Applications: 10th International Workshop, Busan, South Korea, Aug. 25-27, 2009, pp. 178-192.
(Continued)

*Primary Examiner* — David Garcia Cervetti
(74) *Attorney, Agent, or Firm* — Seed IP Law Group LLP

(57) ABSTRACT

A cryptographic circuit performs a substitution operation of a cryptographic algorithm. For each substitution operation of the cryptographic algorithm, a series of substitution operations are performed by the cryptographic circuit. One of the substitution operations of the series is a real substitution operation corresponding to the substitution operation of the cryptographic algorithm. One or more other substitution operations of the series are dummy substitution operations. A position of the real substitution operation in said series is selected randomly.

21 Claims, 11 Drawing Sheets

(52) U.S. Cl.
CPC .......... *H04L 9/0631* (2013.01); *H04L 9/0662* (2013.01); *H04L 2209/043* (2013.01); *H04L 2209/08* (2013.01); *H04L 2209/12* (2013.01)

(58) Field of Classification Search
CPC ..... H04L 9/003; H04L 9/0869; H04L 9/0662; H04L 9/0631; H04L 9/14; H04L 2209/16; H04L 2209/04; H04L 2209/043; H04L 2209/08; H04L 2209/12; G06F 21/602; G06F 21/72
See application file for complete search history.

(56) References Cited

U.S. PATENT DOCUMENTS

| | | | | |
|---|---|---|---|---|
| 10,243,728 | B2* | 3/2019 | Bruneau | H04L 9/0631 |
| 2003/0190155 | A1* | 10/2003 | Tsutsui | G11B 20/00086 |
| | | | | 386/268 |
| 2003/0223580 | A1* | 12/2003 | Snell | H04L 9/0631 |
| | | | | 380/28 |
| 2004/0193898 | A1* | 9/2004 | Ochi | H04L 9/003 |
| | | | | 713/189 |
| 2007/0263859 | A1* | 11/2007 | Teglia | H04L 9/003 |
| | | | | 380/29 |
| 2008/0019503 | A1* | 1/2008 | Dupaquis | H04L 9/002 |
| | | | | 380/28 |
| 2009/0055458 | A1* | 2/2009 | O'Neil | H04L 9/0618 |
| | | | | 708/400 |
| 2009/0074181 | A1 | 3/2009 | Pelletier | |
| 2009/0086976 | A1* | 4/2009 | Scian | H04L 9/003 |
| | | | | 380/277 |
| 2009/0113217 | A1* | 4/2009 | Dolgunov | H04L 9/0894 |
| | | | | 713/190 |
| 2009/0158051 | A1* | 6/2009 | Michiels | H04L 9/002 |
| | | | | 713/189 |
| 2011/0296198 | A1 | 12/2011 | Motoyama | |
| 2013/0064362 | A1* | 3/2013 | Tang | H04L 9/16 |
| | | | | 380/29 |
| 2014/0187202 | A1* | 7/2014 | Buck | H04W 12/08 |
| | | | | 455/411 |
| 2014/0351603 | A1 | 11/2014 | Feix et al. | |
| 2015/0270950 | A1* | 9/2015 | Michiels | H04L 9/002 |
| | | | | 380/28 |
| 2015/0286524 | A1* | 10/2015 | Trantham | G06F 11/108 |
| | | | | 714/766 |
| 2016/0065361 | A1* | 3/2016 | Choi | H04L 9/0631 |
| | | | | 380/287 |
| 2016/0182227 | A1* | 6/2016 | Michiels | H04L 9/06 |
| | | | | 380/28 |
| 2016/0261405 | A1* | 9/2016 | Chevallier-Mames | |
| | | | | H04L 9/0631 |
| 2016/0269175 | A1* | 9/2016 | Cammarota | H04L 9/002 |
| 2016/0350520 | A1* | 12/2016 | Michiels | G06F 21/72 |
| 2017/0244551 | A1* | 8/2017 | Thiebeauld De La Crouee | |
| | | | | H04L 9/3247 |
| 2017/0244552 | A1* | 8/2017 | Thiebeauld De La Crouee | |
| | | | | G09C 1/00 |
| 2017/0373838 | A1* | 12/2017 | Wurcker | H04L 9/0631 |
| 2018/0331820 | A1* | 11/2018 | Rietman | H01L 23/5383 |
| 2019/0057228 | A1* | 2/2019 | Feix | G09C 1/00 |
| 2019/0116022 | A1* | 4/2019 | Kim | H04L 9/002 |
| 2020/0004992 | A1* | 1/2020 | Chong | H04L 9/003 |
| 2020/0092081 | A1* | 3/2020 | Rietman | H04L 9/002 |
| 2020/0125333 | A1* | 4/2020 | Vigilant | H04L 9/0631 |
| 2020/0177365 | A1* | 6/2020 | De Hoogh | H04L 9/002 |
| 2020/0322127 | A1* | 10/2020 | Lozac'H | H04L 9/003 |
| 2021/0058228 | A1* | 2/2021 | Cioranesco | H04L 9/003 |

OTHER PUBLICATIONS

Yang et al., Design Research of the DES against power analysis attacks based on FPGA, *Microprocessors and Microsystems* 35:18-22, 2011.

U.S. Appl. No. 16/281,881, filed Feb. 21, 2019, Method and Device for Performing Substitution Table Operations.

U.S. Appl. No. 16/281,887, filed Feb. 21, 2019, Method and Circuit for Implementing a Substitution Table.

* cited by examiner

METHOD AND CIRCUIT FOR PERFORMING A SUBSTITUTION OPERATION

BACKGROUND

Technical Field

The present disclosure relates to the field of electronic circuits, and in particular to a device and method for accessing substitution tables during a cryptographic operation.

Description of the Related Art

Substitution tables, also known as S-boxes, define a data substitution operation performed during cryptographic algorithms. The purpose of this data substitution is to obscure the relationship between the secret key and the cipher text, and thus render it harder for the secret key to be discovered.

One technique used by hackers wishing to recover the secret key processed by a cryptographic device is to monitor signals on side channels in order to extract certain information relating, for example, to the power consumption or the timing in the device during the execution of a cryptographic algorithm. The manipulation of the secret key during substitution operations is often targeted by hackers using side channel methods due to the relative visibility of substitution operations.

Some solutions have been proposed providing a limited degree of protection against the use of side channel methods.

BRIEF SUMMARY

In an embodiment, a method comprises: executing, using a cryptographic circuit, a cryptographic process including at least one substitution operation, the executing including: performing, for each substitution operation of the cryptographic process, a series of substitution operations of which: one substitution operation of the series is a real substitution operation corresponding to the substitution operation of the cryptographic process; and one or more substitution operations of the series are dummy substitution operations, wherein a position of the real substitution operation in said series of substitution operations is selected randomly. In an embodiment, each substitution operation of the cryptographic process comprises addressing a memory location of a memory based on input data and reading a data value at said memory location to provide output data. In an embodiment, each series of substitution operations comprises a number m of substitution operations, where m is an integer selected randomly for each series. In an embodiment, the method comprises generating a first random value for a first series of substitution operations, and using the first random value to select the number m of substitution operations in said first series. In an embodiment, the method comprises generating a second random value for the first series of substitution operations, and using the second random value to select the position of the real substitution operation in said first series. In an embodiment, performing each series of substitution operations comprises: loading a real input value and N random input values; and supplying, on consecutive S-box access operations, said real input value and m−1 of said random input values to an S-box, wherein an order in which the real input value is supplied with respect to m−1 random input values is selected based on the second random value. In an embodiment, the method comprises, for each series of substitution operations, storing an output value of each substitution operation, and selecting the output value corresponding to said real substitution operation based on said second random value.

In an embodiment, a non-transitory computer-readable medium's contents cause a processing device to perform a method, the method comprising: executing a cryptographic process including at least one substitution operation, the executing including performing, for each substitution operation of the cryptographic process, a series of substitution operations of which: one substitution operation of the series is a real substitution operation corresponding to the substitution operation of the cryptographic process; and one or more substitution operations of the series are dummy substitution operations, wherein a position of the real substitution operation in said series of substitution operations is selected randomly. In an embodiment, each substitution operation of the cryptographic process comprises addressing a memory location of a memory based on input data and reading a data value at said memory location to provide output data. In an embodiment, each series of substitution operations comprises a number m of substitution operations, where m is an integer selected randomly for each series. In an embodiment, the method comprises generating a first random value for a first series of substitution operations, and using the first random value to select the number m of substitution operations in said first series. In an embodiment, the method comprises generating a second random value for the first series of substitution operations, and using the second random value to select the position of the real substitution operation in said first series. In an embodiment, performing each series of substitution operations comprises: loading a real input value and N random input values; and supplying, on consecutive S-box access operations, said real input value and m−1 of said random input values to an S-box, wherein an order in which the real input value is supplied with respect to m−1 random input values is selected based on the second random value. In an embodiment, the method comprises, for each series of substitution operations, storing an output value of each substitution operation, and selecting the output value corresponding to said real substitution operation based on said second random value.

In an embodiment, a cryptographic circuit comprises: a memory circuit, which, in operation, stores one or more substitution tables to implement substitution operations of a cryptographic process; and one or more circuits, which, in operation, execute the cryptographic process, the executing including, for each substitution operation of the cryptographic process, performing a series of substitution operations using a stored substitution table, each series of substitution operations comprising: a real substitution operation of the series corresponding to the substitution operation of the cryptographic process; and one or more dummy substitution operations of the series, wherein a position of the real substitution operation in the series of substitution operations is randomly selected. In an embodiment, the cryptographic circuit comprises a random number generator, which, in operation, generates, for each of said series, a first random value to randomly select a number of dummy substitution operations to be performed in the series. In an embodiment, the random number generator, in operation, generates, for each of said series, a second random value to randomly select the position of the real substitution operation in the series. In an embodiment, the cryptographic circuit comprises a memory, which, in operation, stores a result of the substitution operations of said series. In an embodiment, the one or more circuits is an S-box input circuit comprising:

one or more registers, which, in operation, store a real input value corresponding to said real substitution operation and N random input values; and one or more multiplexers, which, in operation, select, for each substitution operation of each series, a value among said real input value and said N random input values to form an input to the memory circuit storing said stored substitution table. In an embodiment, the cryptographic circuit comprises a selection circuit, which, in operation, generates a selection signal to control the one or multiplexers to perform the selection of said value for each substitution operation of the series. In an embodiment, the one or more circuits comprise one or more processing devices under control of instructions stored in an instruction memory to select, for each substitution operation of each series, either said real input value or a random input value to form an input to the memory circuit storing said substitution table.

In an embodiment, a system comprises: one or more processing cores; and cryptographic circuitry coupled to the one or more processing cores, wherein the cryptographic circuitry, in operation, executes a cryptographic process including at least one substitution operation, the executing including: performing, for each substitution operation of the cryptographic process, a series of substitution operations of which: one substitution operation of the series is a real substitution operation corresponding to the substitution operation of the cryptographic process; and one or more substitution operations of the series are dummy substitution operations, wherein a position of the real substitution operation in said series of substitution operations is selected randomly. In an embodiment, each series of substitution operations comprises a number m of substitution operations, where m is an integer selected randomly for each series. In an embodiment, the cryptographic operation is associated with a function of a processing core of the one or more processing cores.

In an embodiment, a method, comprises: executing, using a cryptographic circuit, substitution operations of a cryptographic process based on one or more scrambled substitution tables, the executing including: performing, for each set of one or more substitution operations of the cryptographic process, a series of sets of one or more substitution operations of which: one set of the series is a real set of one or more substitution operations defined by the cryptographic process, the real set of one or more substitution operations being based on input data modified by a real scrambling key; and one or more other sets of the series are dummy sets of one or more substitution operations, each dummy set of one or more dummy substitution operations being based on: input data modified by respective false scrambling keys different from the real scrambling key; and a different permutation of said substitution tables. In an embodiment, a position of the real set of substitution operations in each series is selected randomly based on a first random value.

In an embodiment, there is provided a method of implementing, by a cryptographic circuit, a substitution operation of a cryptographic algorithm, the method comprising: performing, for each substitution operation of the cryptographic algorithm, a series of substitution operations of which: one is a real substitution operation corresponding to the substitution operation of the cryptographic algorithm; and one or more others are dummy substitution operations, wherein the position of the real substitution operation among the one or more dummy substitution operations in each of said series is selected randomly.

According to one embodiment, each substitution operation comprises addressing a memory location of a memory based on input data and reading a data value at said memory location to provide output data.

According to one embodiment, each series of substitution operations comprises a number m of substitution operations, where m is an integer selected randomly for each series.

According to one embodiment, the method further comprises generating a first random value for a first series of substitution operations, and using the first random value to select the number m of substitution operations in said first series.

According to one embodiment, the method further comprises generating a second random value for a first series of substitution operations, and using the second random value to select the position of the real substitution operation among the one or more dummy substitution operations in said first series.

According to one embodiment, performing each series of substitution operations comprises: loading a real input value and N random input values; and supplying, on consecutive S-box access operations, said real input value and m−1 of said random input values to an S-box, the order that the real input value is supplied with respect to m−1 random input values being selected based on the second random value.

According to one embodiment, the method further comprises, for each series of substitution operations, storing an output value of each substitution operation, and selecting the output value corresponding to said real substitution operation based on said second random value.

In an embodiment, there is provided a non-transitory storage medium storing a computer program configured, when executed by a processing device, to implement one or more of the methods disclosed herein.

In an embodiment, there is provided a cryptographic circuit comprising: a memory circuit storing a substitution table for implementing a substitution operation of a cryptographic algorithm; and one or more circuits configured to perform, for each substitution operation of the cryptographic algorithm, a series of substitution operations using said substitution table, each series of substitution operations comprising: a real substitution operation corresponding to the substitution operation of the cryptographic algorithm; and one or more dummy substitution operations, the one or more circuits being configured to randomly select the position of the real substitution operation among the one or more dummy substitution operations in each of said series.

According to one embodiment, the cryptographic circuit further comprises a random number generator configured to generate, for each of said series, a first random value for randomly selecting the number of dummy substitution operations to be performed in the series.

According to one embodiment, the random number generator is further configured to generate, for each of said series, a second random value for randomly selecting the position of the real substitution operation among the dummy substitution operations.

According to one embodiment, the cryptographic circuit further comprises a memory for storing a result of the substitution operations of each of said series.

According to one embodiment, the one or more circuits is an S-box input circuit comprising: one or more registers configured to store a real input value corresponding to said real substitution operation and N random input values; and one or more multiplexers configured to select, for each substitution operation of each series, a value among said real input value and said N random input values to form an input to the memory circuit storing said substitution table.

According to one embodiment, the cryptographic circuit further comprises a selection circuit configured to generate a selection signal for controlling the one or multiplexers to perform the selection of said value for each substitution operation.

According to one embodiment, the one or more circuits comprise one or more processing devices under control of instructions stored in an instruction memory to select, for each substitution operation of each series, either said real input value or a random input value to form an input to the memory circuit storing said substitution table.

BRIEF DESCRIPTION OF THE DRAWINGS

The foregoing and other features and advantages will become apparent from the following detailed description of embodiments, given by way of illustration and not limitation with reference to the accompanying drawings, in which.

DETAILED DESCRIPTION

Throughout the present disclosure, the term "connected" is used to designate a direct electrical connection between circuit elements, whereas the term "coupled" is used to designate an electrical connection between circuit elements that may be direct, or may be via one or more intermediate elements such as multiplexers, buffers, etc.

Furthermore, throughout the present disclosure, the following terms will be considered to have the following definitions:

"cryptographic algorithm or process"—any series of operations performed by a device that involves the manipulation of a secret value, such as a secret key, which is to be hidden from the world outside the device. Examples of cryptographic algorithms include algorithms for encrypting or decrypting plaintext/cipher-text based on a secret key, for generating a message authentication code (MAC) or other form of digital signature based on a secret algorithm and/or key, or any other type of secretive operation;

"substitution operation" or "S-box access"—an operation of a cryptographic algorithm in which an output data value is generated based on an input data value using a substitution table, e.g., an S-box. The input and output values may have the same, or a different, number of bits. This operation is for example performed using a lookup table (LUT) stored in a memory, and the values defined in the lookup table may be fixed, or could be updated dynamically;

"real substitution operation"—a substitution operation defined by the cryptographic algorithm that is being executed, which is for example a useful operation in that the result of the substitution will contribute towards the calculation of the output data of the cryptographic algorithm; and "dummy substitution operation"—a fake or false substitution operation performed in the same manner as a real substitution operation, but which is superfluous as it is performed in addition to the real substitution operations defined by the cryptographic algorithm. While the result of each dummy substitution operation may be stored to memory, it is not useful in that the result serves no purpose in relation with the cryptographic algorithm and can be discarded. As described herein, the dummy substitution operations are for example performed based on random input data.

Figure 1:
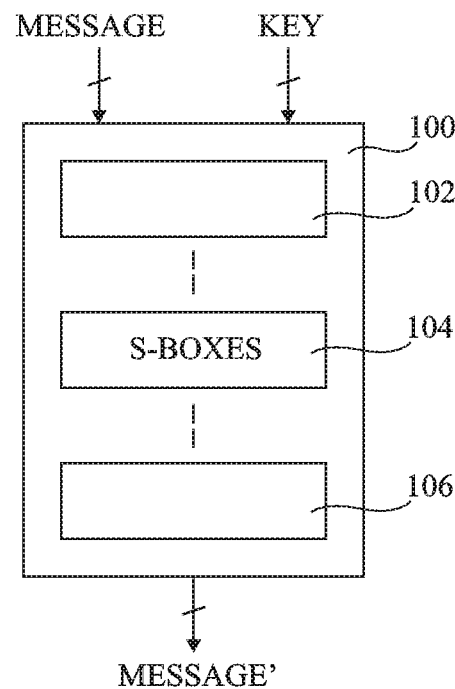
FIG. 1 schematically illustrates a circuit for executing a cryptographic algorithm involving substitution operations according to an example embodiment.

FIG. 1 schematically illustrates a cryptographic circuit 100 according to an example embodiment. The circuit 100 for example receives as inputs a message (MESSAGE) to be processed and a secret key (KEY). For example, the message corresponds to plaintext to be encrypted by the circuit 100 using the secret key, to cipher-text to be decrypted by the circuit 100 using the secret key, or to data that is to be signed by the circuit 100 by generating a digital signature, such as a MAC (message authentication code) based on the key.

The circuit 100 comprises a series of hardware modules implementing various operations 102, 104, 106 on the message and key in order to generate an output message (MESSAGE') corresponding to cipher-text, plaintext and/or a digital signature. In the example of FIG. 1, the operation 104 corresponds to a substitution operation involving one or more substitution tables (S-BOXES).

Figure 2:
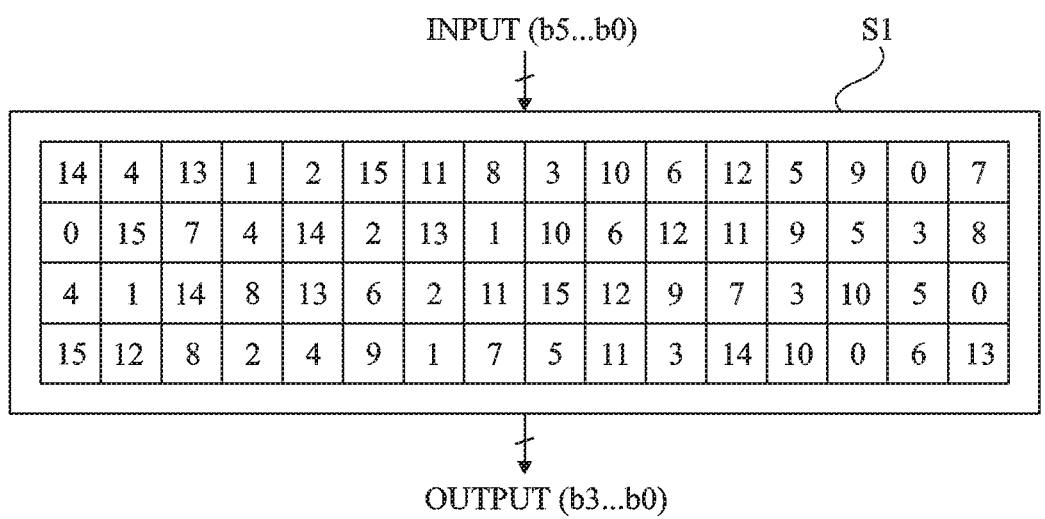
FIG. 2 schematically illustrates an S-box according to an example embodiment.

FIG. 2 schematically illustrates an example of an S-box used during the DES (data encryption standard) algorithm. As known to those skilled in the art, the DES encryption algorithm involves 8 S-boxes S1 to S8, each of which is unique. FIG. 2 illustrates the DES S-box S1.

An S-box access according to the DES encryption algorithm involves inputting 6 input bits (INPUT) b5 to b0, and outputting 4 output bits (OUTPUT) b3 to b0. The S-box S1 is in the form of a lookup table having 16 columns and 4 rows. The bits b5 and b0 of the input value are for example used to select a row of the table, and the bits b4 to b1 of the input value are for example used to select a column of the table. The 4-bit value stored in the selected row and column forms the output value of the S-box.

Of course FIG. 2 illustrates only one example of an S-box, and the principles described in the present disclosure could be applied to any type of S-box in which input data is substituted in order to generate output data based on a table of stored values.

Figure 3:
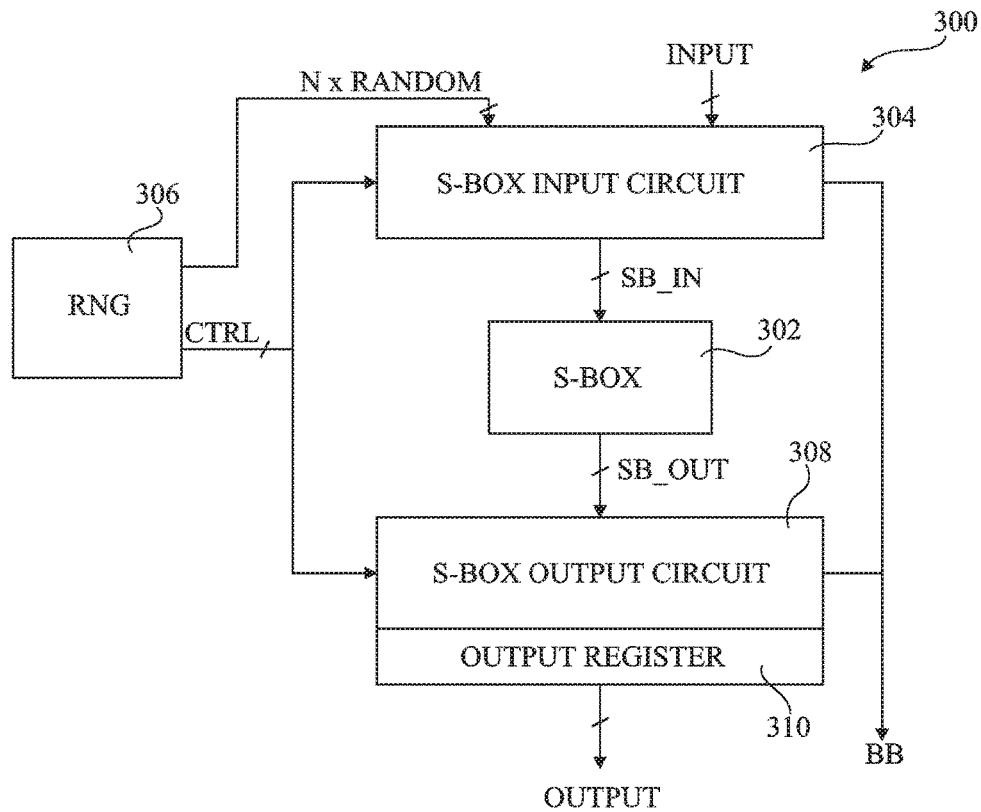
FIG. 3 schematically illustrates a cryptographic circuit for performing S-box accesses according to an example embodiment of the present disclosure.

FIG. 3 schematically illustrates a cryptographic circuit 300 for implementing S-box access operations according to an example embodiment of the present disclosure. The circuit 300 for example forms part of the circuit 100 of FIG. 1.

The circuit 300 comprises an S-box 302 receiving input data SB_IN, and providing output data SB_OUT. The S-box 302 is for example implemented by a non-volatile memory, in which the input data SB_IN provides an address input to the memory, and the output data SB_OUT corresponds to the data value stored at the addressed location in the memory.

The S-box 302 for example corresponds to the S-box S1 of FIG. 2, or to any other S-box of the DES encryption standard. Alternatively, the S-box 302 could correspond to an S-box used in the TDES (Triple DES), AES (advanced encryption standard) or SM4 (formerly known as SMS4) encryption standards, or in any other encryption standard.

The circuit 300 further comprises an S-box input circuit (S-BOX INPUT CIRCUIT) 304 receiving an input value INPUT corresponding to a real substitution operation to be performed in relation with a cryptographic algorithm. For example, the input value INPUT is the result of an operation performed on the message data and the key data of FIG. 1.

The S-box input circuit 304 also receives N random input values (N×RANDOM), and a control signal CTRL, from a random number generator (RNG) 306. The generator 306 is for example a pseudo-random number generator or a true random number generator.

The circuit 300 further comprises an S-box output circuit (S-BOX OUTPUT CIRCUIT) 308 that receives the output data SB_OUT from the S-box 302 and also the control signal CTRL from the random number generator 306. The S-box output circuit 308 is for example coupled to an output register (OUTPUT REGISTER) 310, which provides output data OUTPUT representing the result of the S-box access operation. In some embodiments, the input circuit 304 and the output circuit 308 assert a busy bit (BB) to indicate to a host system the periods in which the S-box 302 is occupied.

In operation, for each S-box access operation to be performed in view of a corresponding substitution operation of a cryptographic algorithm, a series of S-box accesses is performed by S-box input circuit 304. Only one of these accesses corresponds to the real S-box access relating to the substitution operation of the cryptographic algorithm. The other one or more S-box accesses correspond to dummy accesses based on the random values provided by the generator 306, the results of which may be discarded.

For example, each time an S-box access is to be performed, the real input data value and N random input values are loaded into the S-box input circuit 304, where N is a positive integer for example equal to at least 7 in some embodiments. The control signal CTRL generated by the random number generator 306 for example comprises a value NFC indicating the number of dummy accesses to be implemented, and a value RAC indicating the position of the real access with respect to the dummy accesses.

For example, in one embodiment the value NFC is a 2-bit value, and the value RAC is a 3-bit value. The number NF of dummy S-box accesses in each series of S-box accesses is for example equal to:

$$NF = 2^{NFC} - 1$$

Thus, with the value of NFC being equal to 0, 1, 2 or 3, the number NF of dummy S-box accesses can for example be 0, 1, 3 or 7. Furthermore, the value RAC is for example used to determine the position of the real access by performing a logic AND operation between the 3-bit binary value RAC and a 3-bit binary value representing the number NF.

By randomly generating the value of NFC for each series of S-box accesses, the processing time for each real S-box access will be variable. Thus, as the duration of each S-box access is no longer predictable, the busy bit BB for example indicates to the host processing system the time periods during which the S-box 302 is occupied.

According to some embodiments, the S-box output circuit 308 stores each of the output values SB_OUT from the S-box 302 during each access operation to the output register 310. Furthermore, the circuit 308 for example selects the real output value to form the output value OUTPUT of the register 310 based on the control signal CTRL. In particular, the value NFC indicates the number of dummy output values provided by the S-box 302, and the value RAC indicates the position of the real output value with respect to the dummy output values.

Operation of the circuit of FIG. 3 will now be described in more detail with reference to FIG. 4.

Figure 4:
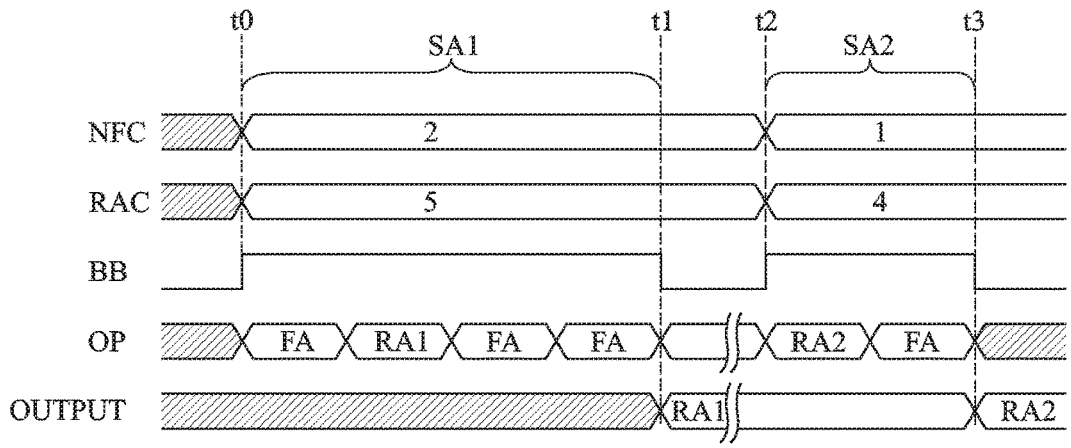
FIG. 4 is a timing diagram illustrating an example of signals in the circuit of FIG. 3.

FIG. 4 is a timing diagram representing examples of the signals NFC, RAC, BB, of S-box access operations OP, and of the output value OUTPUT, during a series of accesses SA1 and SA2 using the circuit of FIG. 3.

In the example of FIG. 4, during the series of accesses SA1, the value of NFC is randomly generated to equal 3, and the value of RAC is randomly generated to equal 5. Thus the number NF of dummy S-box operations in the series SA1 is equal to 3. The total number of S-box accesses in any series is equal to NF+1, and the result of the operation NF*RAC is for example a 3-bit value that may assume a value between 0 and NF, where 0 represents the first access of the series, and NF represents the last access of the series. Thus, in the example of the series of accesses SA1, the position of the real access operation is equal to a logic AND applied bit by bit to the values "011" and "101", which gives "001", corresponding to the second access of the series.

The busy bit BB for example goes high at a time t0 at the start of the series of access operations SA1, which comprises four S-box accesses corresponding, in sequence, to: a dummy access FA; a real access RA1; a dummy access FA; and a dummy access FA. The busy bit BB then for example goes low at the time t1 following the last access, and the output value OUTPUT becomes equal to the result of the real access RA1 a short time later.

During the series of S-box accesses SA2, the value of NFC is randomly generated to equal 1, and the value of RAC is randomly generated to equal 4. Thus the number NF of dummy S-box operations in the series SA2 is equal to 1, and the position of the real access operation in the series SA2 is equal to a logic AND applied bit by bit to the values "001" and "100", which gives "000", corresponding to the first access of the series.

The busy bit BB for example goes high at a time t2 at the start of the series of access operations SA2, which comprises two S-box accesses corresponding, in sequence, to: a real access RA2; and a dummy access FA. The busy bit BB then for example goes low at the time t3 following the last access, and the output value OUTPUT becomes equal to the result of the real access RA2 a short time later.

Figure 5:
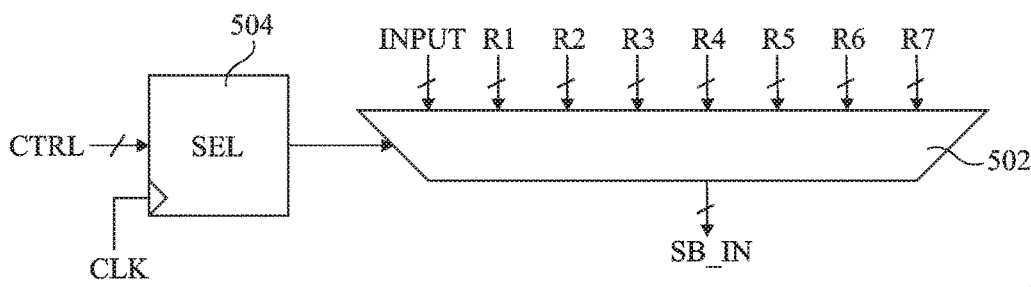
FIG. 5 schematically illustrates part of an S-box input circuit of FIG. 3 in more detail according to an example embodiment of the present disclosure.

FIG. 5 schematically illustrates part of the S-box input circuit 304 of FIG. 3 in more detail according to an example embodiment. The circuit 304 for example comprises a multiplexor 502 having N+1 inputs for receiving the N random values from the random number generator 306, and the real input value INPUT. In the example of FIG. 5, N is equal to 7, and the 7 random values are labelled R1 to R7.

The circuit 304 also for example comprises a selection circuit (SEL) 504 that generates a selection signal for controlling the multiplexer 502 based on the control signal CTRL from the random number generator 306. The selection circuit 504 for example receives a clock signal CLK indicating the period of each access operation such that the selection signal can be updated at the appropriate time. As indicated above, depending on the number of dummy access operations in a given series of S-box accesses, the number of these random input values used during this series of accesses will vary between none and N. The random values R1 to R7 are for example refreshed after each series of S-box accesses, in other words each time the input data INPUT is updated.

The example of FIGS. 3 and 5 corresponds to a hardware implementation. In alternative embodiments, the method of performing an S-box access described herein could be implemented in software, as will now be described in more detail with reference to FIGS. 6 and 7.

Figure 6:
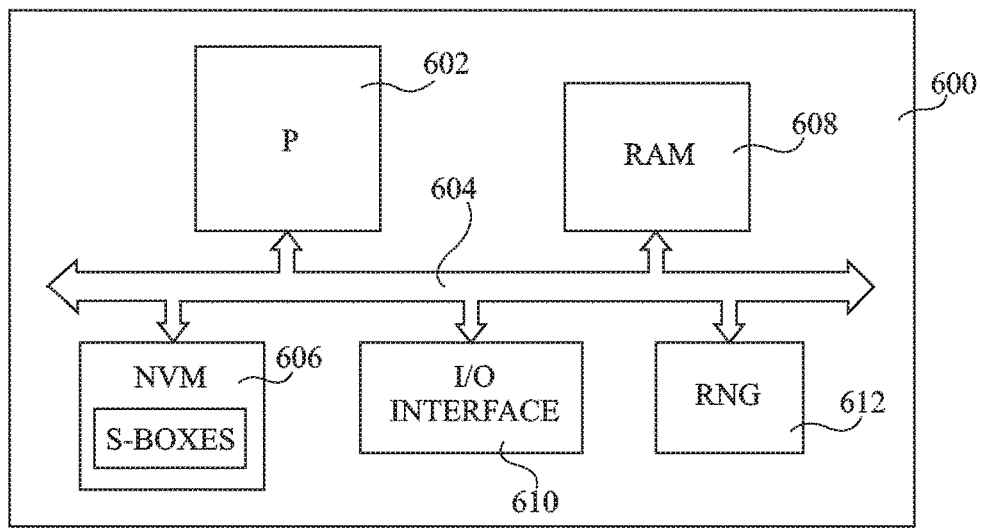
FIG. 6 schematically illustrates a processing system for performing S-box accesses according to an example embodiment of the present disclosure.

FIG. 6 schematically illustrates a processing system 600 according to an example embodiment of the present disclosure. The system 600 for example comprises a processing device (P) 602 coupled via a bus 604 to a memory 606 storing one or more S-boxes (S-BOXES) 606. The memory 606 is for example a non-volatile memory (NVM). The system 600 also for example comprises, coupled to the bus 604, a volatile memory 608, which is for example a RAM (random access memory), an input/output interface (I/O INTERFACE) 610, and a random number generator 612. The processing device 602 for example comprises one or more processing cores under control of instructions stored in an instruction memory, for example the memory 606 and/or 608.

Figure 7:
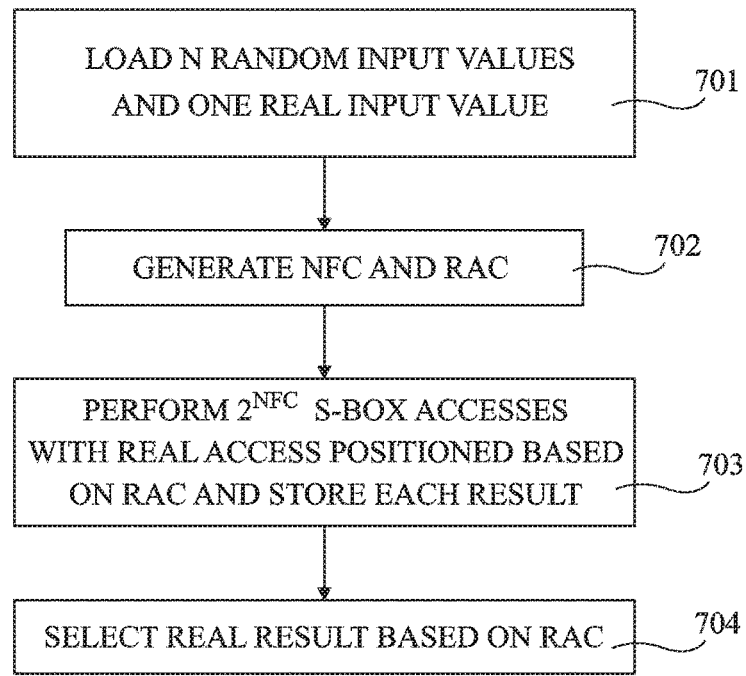
FIG. 7 is a flow diagram representing operations in a method of performing an S-box access according to an example embodiment of the present disclosure.

FIG. 7 is a flow diagram illustrating operations in a method of performing an S-box access according to an example embodiment of the present disclosure, and using the processing system of FIG. 6.

In an operation 701, N random input values and one real input value are for example loaded into the working memory of the processing device 602, the working memory for example corresponding to the RAM 608. The random values are for example generated by the random number generator 612, whereas the real input value is for example a result, stored to the RAM 608, of a previous operation performed by the processing device 602 involving a secret key.

In an operation 702, the random values NFC and RAC are generated, for example based on random values provided by the generator 612. These values are for example stored in the RAM 608.

In an operation 703, the processing device 602 performs $2^{NFC}$ S-box accesses, wherein one of these accesses corresponds to a real access based on the real input value, and $2^{NFC}-1$ of these accesses correspond to dummy accesses, and wherein the real access is positioned with respect to the dummy accesses based on the value RAC. Each access is for example performed by addressing the non-volatile memory 606, and in particular a lookup table stored in the non-volatile memory 606. The result of each access is stored to memory, such as to the RAM 608.

In operation 704, the result corresponding to the real access is selected to be used in the cryptographic algorithm, based on the random values NFC and RAC. For example, the processing device 602 selects in the RAM 608, based on the values of the random values NFC and RAC, an address corresponding to the storage location of the result of the real substitution operation.

Figure 8:
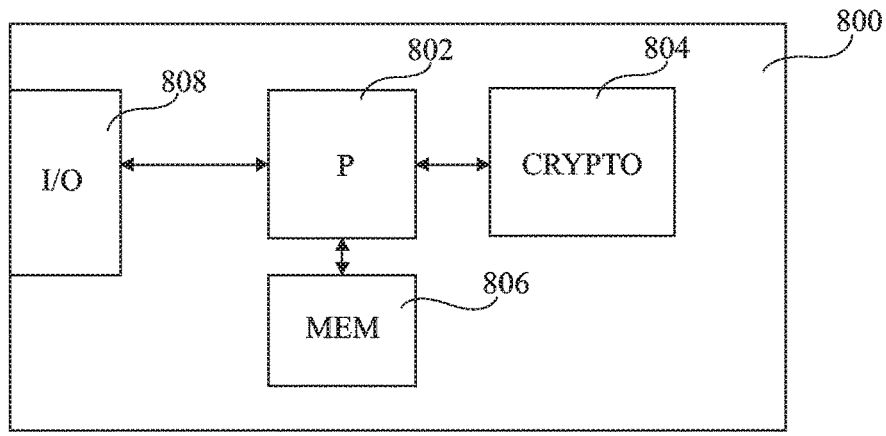
FIG. 8 schematically illustrates a cryptographic device according to an example embodiment of the present disclosure.

FIG. 8 schematically illustrates a cryptographic device 800 according to an example embodiment.

The device 800 for example comprises a processing device 802 corresponding to the host processor of the cryptographic device 800. The processing device 802 is for example in communication with a cryptographic circuit 804, which for example corresponds to the circuit 300 of FIG. 3, or to some or all of the components of the processing system 600. The cryptographic device 800 also for example comprises a memory (MEM) 806 and an input/output interface (I/O) 808 in communication with processing device 802.

The device 800 for example corresponds to an integrated circuit card (often known as a "smart card"), portable electronic device or other type of electronic device in which a cryptographic function is to be realized. In some embodiments, the input/output interface 808 may correspond to an NFC (near-field communication) interface.

An advantage of the embodiments described herein is that the discovery of a secret key manipulated during substitution operations of a cryptographic algorithm using side channel methods can be rendered considerably more difficult. Indeed, by performing dummy accesses and positioning the real S-box access at a random position with respect to the dummy S-box accesses, this creates a dissymmetry of the leakages during each real S-box access, and it becomes very difficult for a meaningful correlation to be determined between side channel signals during the S-box accesses and the value of the secret key. Furthermore, the discovery of the secret key can be rendered even more difficult by additionally randomizing the number of dummy substitution operations performed for each real substitution operation.

An advantage of an embodiment of the hardware implementation of FIGS. 3 and 5 is that switching between dummy and real S-box accesses can be performed relatively rapidly, leading to a relatively small time overhead for the additional S-box accesses.

Having thus described at least one illustrative embodiment, various alterations, modifications and improvements will readily occur to those skilled in the art. For example, it will be apparent to those skilled in the art that the circuit of FIG. 5 implementing the S-box input circuit is merely one example, and that many alternative implementations would be possible.

Furthermore, while an example has been provided in which the values NFC and RAC have respectively 2 and 3 bits, it will be apparent to those skilled in the art that these values could have a different number of bits depending on the value of N.

Furthermore, while embodiments have been described based on a single S-box, certain cryptographic algorithms, such as DES, use a plurality of S-boxes in parallel. The embodiments described herein could also be applied to each of a plurality of S-boxes operating in parallel.

Furthermore, it will be apparent to those skilled in the art that the various features described in relation with the embodiments of FIGS. 3 and 6 could be combined, in alternative embodiments, in any combination. For example, it would be possible to implement the S-box access method of the present disclosure using a combination of hardware and software.

Figure 9:
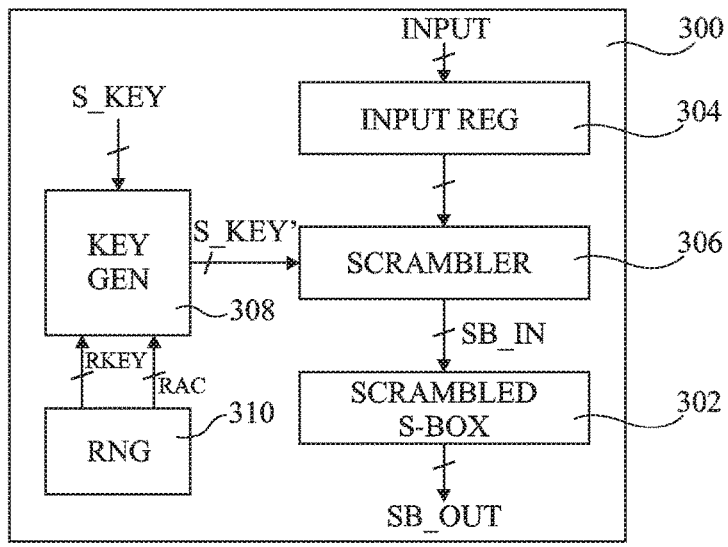
FIG. 9 schematically illustrates substitution circuit according to an example embodiment of the present disclosure.

FIG. 9 schematically illustrates a substitution circuit 300 for implementing S-box access operations according to an example embodiment of the present disclosure. The circuit 300 for example forms part of the circuit 100 of FIG. 1.

The circuit 300 comprises a scrambled S-box (SCRAMBLED S-BOX) 302 receiving input data SB_IN, and providing output data SB_OUT. The scrambled S-box 302 is for example implemented by a non-volatile memory, in which the input data SB_IN provides an address input to the memory, and the output data SB_OUT corresponds to the data value stored at the addressed location in the memory.

The scrambled S-box 302 for example corresponds to the S-box S1 of FIG. 2, in which a permutation has been applied to the memory locations based on a scrambling key. Alternatively, the scrambled S-box 302 could correspond to a scrambled version of any other S-box of the DES encryption standard or other encryption standard, such as an S-box used in the TDES (transparent DES), AES (advanced encryption standard) or SM4 (formerly known as SMS4) encryption standards.

The circuit 300 further comprises an input register (INPUT REG) 304 receiving an input value INPUT corresponding to a substitution operation to be performed in relation with a cryptographic algorithm. For example, the input value INPUT is the result of an operation performed on the message data and the key data of FIG. 1.

The circuit 300 further comprises a scrambler (SCRAMBLER) 306 that receives the input value from the input register 304, and generates modified input data to be provided as the input SB_IN to the scrambled S-box 302. In particular, the scrambler 306 modifies the input data based on a key S_KEY' provided by a key generator (KEY GEN) 308. The key generator 308 for example receives the real scrambling key S_KEY, and a random value RAC generated by a random number generator (RNG) 310. The random number generator 310 is for example a pseudo-random number generator or a true random number generator. In some embodiments, the key generator 308 also receives random key values RKEY from the random number generator 310.

In operation, each set of one or more substitution operations defined by the cryptographic algorithm is implemented, by the circuit of FIG. 9, by a series of m sets of one or more S-box access operations, where m is for example an integer equal to two or more. Only one of the m sets of one or more S-box access operations corresponds to the real set of substitution operations of the cryptographic algorithm and uses the correct scrambling key S_KEY. The other m−1 sets of one or more access operations of each series correspond to dummy sets of substitution operations involving false scrambling keys S_KEY', which are for example each different from each other for a given series of S-box accesses.

For example, for each substitution operation to be performed using the S-box 302, the input data value INPUT is loaded into the input register 302, and processed m times by the scrambler 306 based on m different values of the scrambling key S_KEY' in order to generate m different modified S-box input values SB_IN provided to the S-box 302. The key generator 308 generates the keys S_KEY' based on the random value RAC generated by the random number generator 310, and in some embodiments based on the random key values RKEY.

For example, the value RAC comprises an r-bit value indicating the position of the real key S_KEY among the m−1 false keys, and thus indicates the position of the real set of one or more substitution operations among the m−1 dummy set of one or more substitution operations. For example, $2^r$ is equal to m. In one example, m is equal to 4, and r is equal to 2, where a value RAC of "00" indicates the first of the four substitution operations, and a value of RAC of "11" indicates the fourth of the four substitution operations.

In some embodiments, each of the m−1 false keys generated for a given series of sets of one or more S-box accesses is derived from the real key S_KEY. For example, each false key results from a function F applied to the real key S_KEY. In one embodiment, the function F is a shift operation. For example, the real key and three false keys could be as follows:

|     | KEY VALUE  | Function F     |
| --- | ---------- | -------------- |
| RK  | [01001110] | None           |
| FK1 | [10011100] | Left shift by 1 |
| FK2 | [00111001] | Left shift by 2 |
| FK3 | [01110010] | Left shift by 3 | where RK is the real key S_KEY, and FK1, FK2 and FK3 are the false keys derived from the real key.

Alternatively, the false keys could be generated based on another function F applied to the real key S_KEY, or based on the random key values RKEY provided by the random number generator 310.

In some embodiments, for a given value k of the cryptographic key used during the cryptographic algorithm, the false scrambling keys applied during each of the m−1 sets of dummy access operations are fixed until the cryptographic key is changed.

Figure 10:
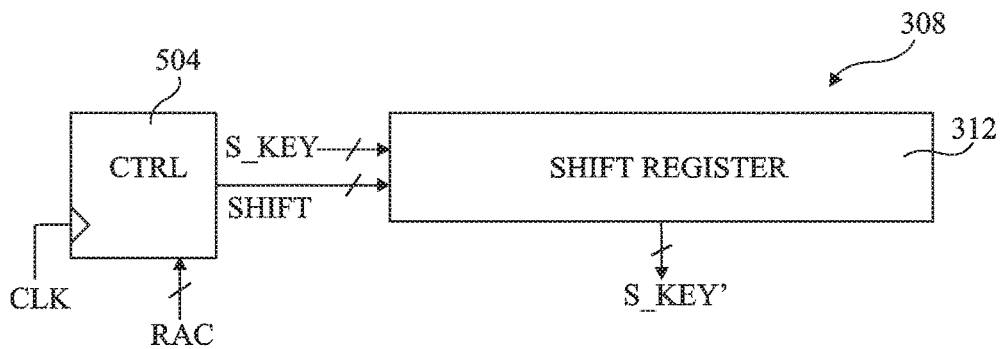
FIG. 10 schematically illustrates a scrambling key generator of the substitution circuit of FIG. 9 in more detail according to an example embodiment of the present disclosure.

FIG. 10 schematically illustrates the key generator 308 of FIG. 9 in more detail according to an example embodiment in which the false scrambling keys are generated by shifting the real scrambling key S_KEY.

The generator 308 for example comprises a shift register (SHIFT REGISTER) 312 receiving the real scrambling key S_KEY, and a shift select signal SHIFT indicating a shift to be applied to the key S_KEY. For example, the signal SHIFT indicates that no shift is to be applied when the real set of one or more access operations is to take place, and applies a left shift by a different number of bit positions for each of the false scrambling keys to be applied during the dummy set of access operations.

The key generator 308 also for example comprises a control circuit (CTRL) 504 generating the shift select signal SHIFT based on the value RAC provided by the random number generator 310. In particular, the control circuit 504 for example selects the position of the real scrambling key during each series of sets of S-box accesses based on the value RAC. The control circuit 504 for example receives a clock signal CLK indicating the period of each S-box access operation such that the shift selection signal SHIFT can be updated at the appropriate time.

According to one embodiment that will now be described with reference to FIGS. 11 and 12, each set of substitution operations corresponds to the substitution operations performed during the execution of a cryptographic algorithm based on a given message and key.

Figure 11:
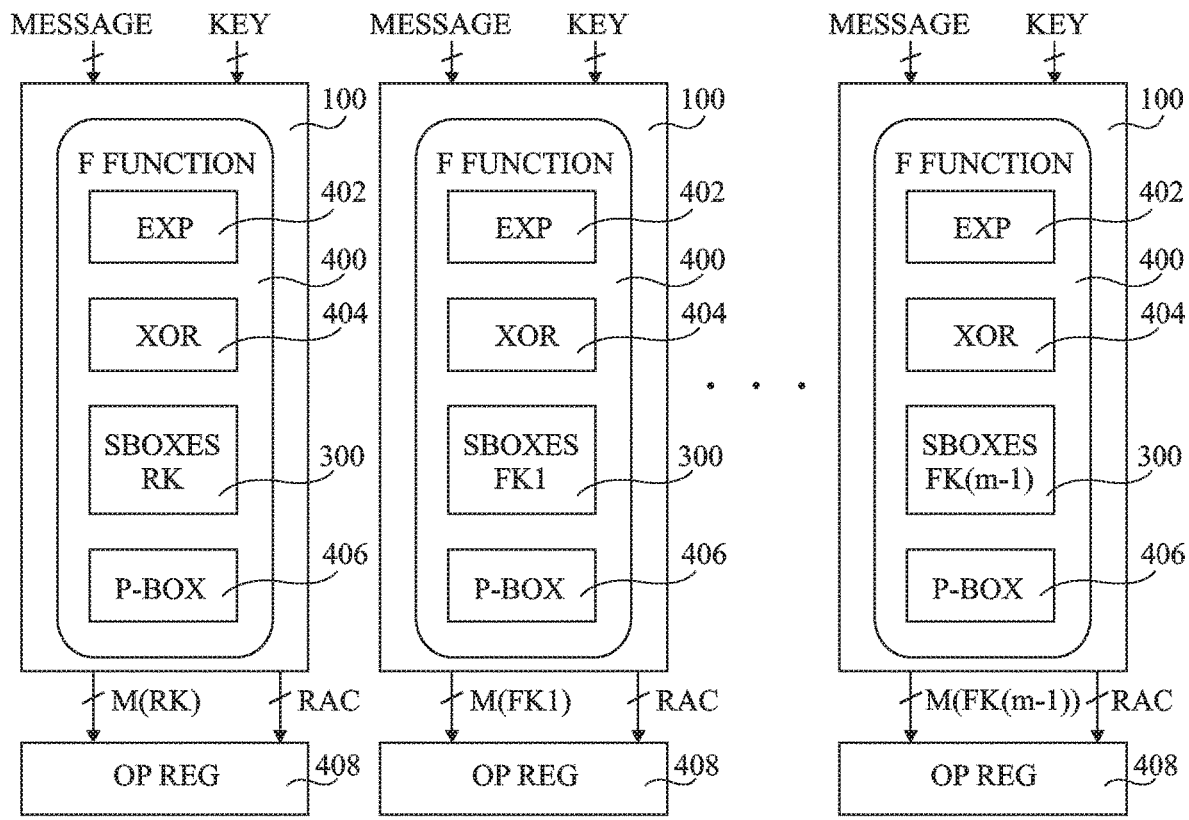
FIG. 11 schematically illustrates a circuit for executing a series of cryptographic operations according to an example embodiment of the present disclosure.

FIG. 11 illustrates the cryptographic circuit 100 of FIG. 1 in more detail for a series of m sets of substitution operations each corresponding to an execution of the DES algorithm based on a given message (MESSAGE) and key (KEY). The cryptographic circuit 100 for example comprises a circuit 400 (F FUNCTION) for executing a round function, each round for example comprising an expansion operation (EXP) performed by a circuit 402, an XOR operation (XOR) performed by a circuit 404 to introduce a round key, the substitution operation (S-BOXES) performed by the substitution circuit 300, and a permutation operation (P-BOX) performed by a circuit 406. The message M resulting from each execution of the DES algorithm is provided to an output register (OP REG) 408, along with the random value RAC.

The cryptographic circuit 100 is illustrated multiple times in FIG. 11 to represent the substitution operation performed during each of the series of m executions of the DES algorithm. One of these executions shown on the left in FIG. 11 is based on the real scrambling key (RK), whereas the other executions are respectively based on different false scrambling keys FK1 to FK(m−1). The order of the real and fake DES executions is selected randomly for each series of executions based on the randomly generated value RAC.

Figure 12:
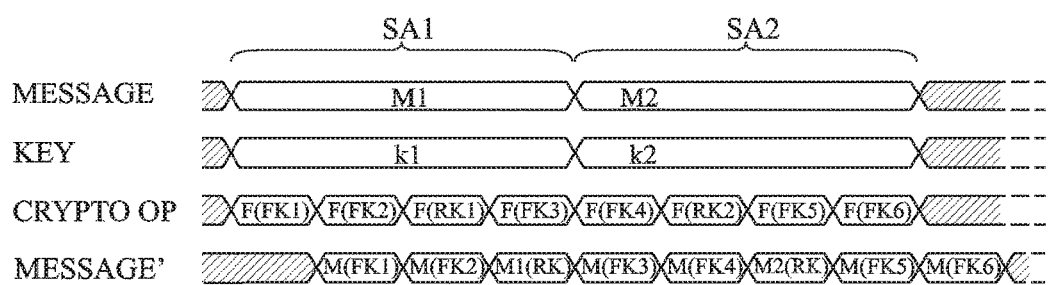
FIG. 12 is a timing diagram illustrating an example of signals in the circuit of FIG. 11.

FIG. 12 is a timing diagram representing an example of the inputs MESSAGE and KEY of the circuit 100 of FIG. 11, of the operations (CRYPTO OP) performed by the circuit 100, and of the output message (MESSAGE') generated during each execution.

A first series SA1 of DES executions is based on an input message M1 and on a cryptographic key k1 and a second series SA2 of DES executions is based on an input message M2 and on a cryptographic key k2. In the example of FIG. 11, the number m of DES executions in each series is fixed at four, although in alternative embodiments m could be any integer equal to 2 or more. The series SA1 for example comprises three fake DES executions F(FK1), F(FK2) and F(FK3) respectively based on false scrambling keys FK1, FK2 and FK3, and a real DES execution F(RK) based on the real scrambling key RK. The series SA2 for example comprises three fake DES executions F(FK4), F(FK5) and F(FK6) respectively based on false scrambling keys FK4, FK5 and FK6, and a real DES execution F(RK) based on the real scrambling key RK. The position of the real DES execution among the fake executions is randomly selected for each series of m executions, and is the third position in the series SA1 and the second position in the series SA2 in the example of FIG. 12.

In some embodiments, the group of fake scrambling keys in each series of sets of access operations is fixed for a given cryptographic key, and only the position of the real set of access operations varies between the series. Each time the cryptographic key changes, a new group of fake scrambling keys is for example selected.

The message MESSAGE' resulting from each execution of the cryptographic algorithm is for example output following the termination of each execution of the cryptographic algorithm, and these messages are for example labelled M(FK1) to M(FK6) in the case of the fake executions F(FK1) to F(FK6), and M1(RK) and M2(RK) in the case of the real executions. During each series of executions, all of the messages are for example stored to the output register 408, and the random value RAC is for example used to select only the real messages from the output register 408 to provide the result of the cryptographic algorithm.

Figure 13:
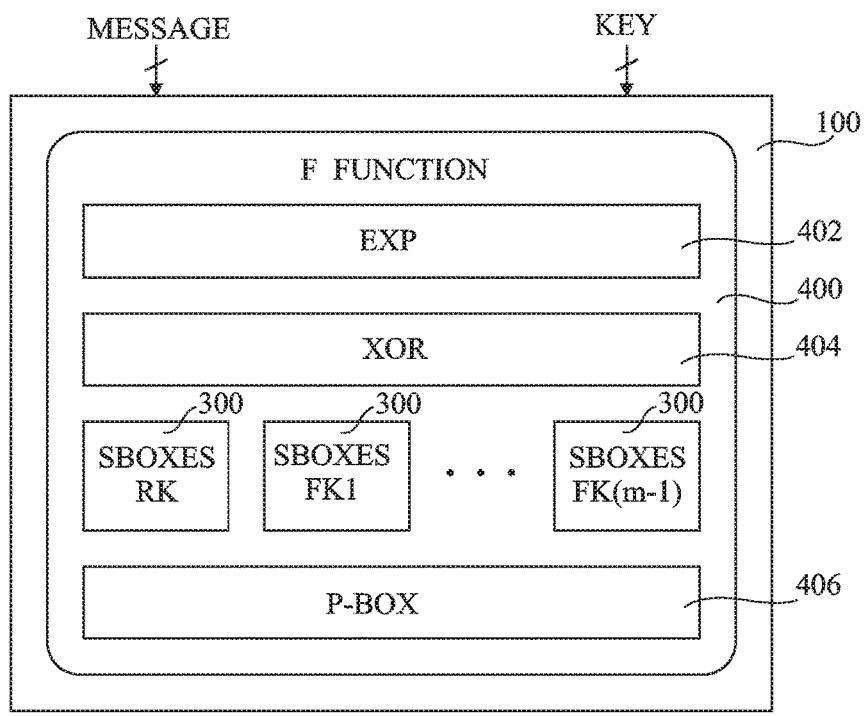
FIG. 13 schematically illustrates a circuit for executing a series of substitution operations according to a further example embodiment of the present disclosure.

FIG. 13 illustrates the cryptographic circuit 100 of FIG. 1 in more detail for a series of m substitution operations performed in place of a single substitution operation. The example of FIG. 13 is again based on the DES algorithm, and involves the same circuit 400 of FIG. 11. However, in the case of FIG. 13, each time the substitution circuit 104 is called to apply a substitution operation within a given execution of the round function, a series of m substitution operations is performed.

The substitution circuit (S-BOXES) 300 is illustrated multiple times in FIG. 13 to represent the substitution operation performed during each of the series of m substitution operations. One of these substitution operations shown on the left in FIG. 13 is the real substitution operation based on the real scrambling key (RK), whereas the other substitution operations are respectively based on false scrambling keys FK1 to FK(m−1). The order of the real and fake substitution operations is selected randomly for each series of substitution operations based on the randomly generated value RAC.

Figure 14:
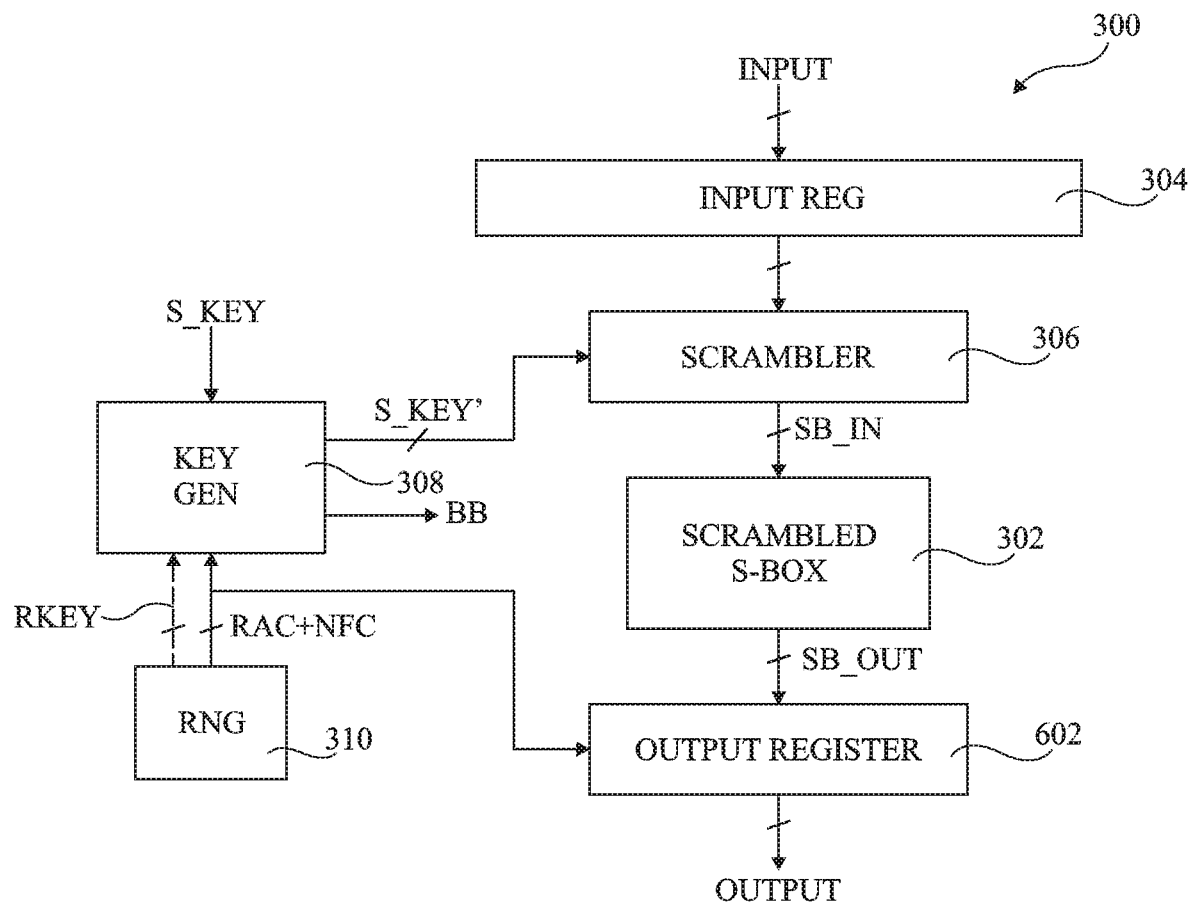
FIG. 14 schematically illustrates a substitution circuit of FIG. 13 in more detail according to an example embodiment of the present disclosure.

FIG. 14 illustrates the substitution circuit 300 of FIG. 9 in more detail according to an example embodiment. The circuit 300 of FIG. 14 is for example similar to that of FIG. 9, and like features are labelled with like reference numerals and will not be described again in detail.

In the example of FIG. 14, the number m−1 of false substitution operations is for example variable, and the random generator 308 for example generates, in addition to the value RAC, a value NFC indicating the number of false or dummy substitution operations to be applied to the current series of substitution operations. The key generator 308 for example generates a busy bit (BB) to indicate to a host system the periods during which the S-box is occupied.

Furthermore, in the example of FIG. 14, the outputs of the scrambled S-box 302 are provided to an output register (OUTPUT REG) 602, which also for example receives the random values RAC and NFC from the random number generator 310.

In some embodiments, the value NFC may be fixed for a given key, while in other embodiments, this value is randomly generated for each series of substitution operations.

For example, in one embodiment, the value NFC is a 2-bit value, and the value RAC is a 3-bit value. The number m−1 of dummy S-box accesses in each series of S-box accesses is for example equal to:

$$m-1=2^{NF}-1$$

Thus, with the value of NFC being equal to 0, 1, 2 or 3, the number m−1 of dummy S-box accesses can for example be 0, 1, 3 or 7. Furthermore, the value RAC is for example used to determine the position of the real access by performing a logic AND operation between the 3-bit binary value RAC and a 3-bit binary value FN representing the number m−1.

By randomly generating the value of NFC for each series of S-box accesses, the processing time for each real S-box access will be variable. Thus, as the duration of each S-box access is no longer predictable, the busy bit BB for example indicates to the host processing system the time periods during which the S-boxes 301 is occupied.

The output register 602 for example stores each of the output values SB_OUT from the scrambled S-box 302 during each of the substitution operations of each series. Furthermore, the circuit 602 for example selects the real set of output values to form the output value OUTPUT based on the values RAC and NFC.

Operation of the circuit of FIG. 14 will now be described in more detail with reference to FIG. 15.

Figure 15:
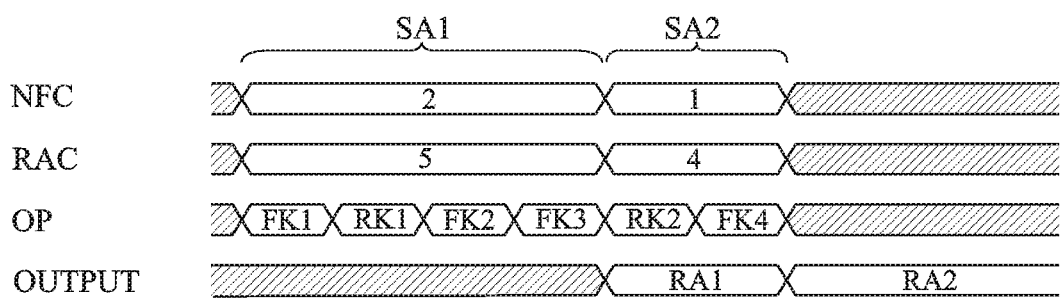
FIG. 15 is a timing diagram illustrating an example of signals in the circuit of FIG. 14.

FIG. 15 is a timing diagram representing examples of the cryptographic key KEY used to generate the input data for each S-box access, the value RAC, the S-box access operations OP, and the output value OUTPUT during a series of accesses SA1 and SA2 using the circuit of FIG. 14.

During the series of substitution operations SA1, the values of NFC and RAC are randomly generated to equal 2 and 5 respectively. Thus, based on the above equation, the number m−1 of dummy sets of one or more S-box operations in the series SA1 is equal to 3. The total number of sets of S-box accesses in any series is equal to m, and the result of the operation NF*RAC is for example a 3-bit value that may assume a value between 0 and NF, where 0 represents the first access of the series, and NF represents the last access of the series. Thus, in the example of the series of accesses SA1, the position of the real access operation is equal to a logic AND applied bit by bit to the values "011" and "101", which gives "001", corresponding to the second access of the series. Thus, in the example of the series of accesses SA1, the position of the real set of access operations is second, and the series SA1 of m access operations comprises, in sequence: a dummy access operation using a false scrambling key FK1; a real access operation RK1 using the real scrambling key; a dummy access operation using a false scrambling key FK2; and a dummy access operation using a false scrambling key FK3. After the last access operation, the output value OUTPUT becomes equal to the result of the real access operation RK1.

During the series of substitution operations SA2, the values of NFC and RAC are randomly generated to equal 1 and 4 respectively. Thus the number m−1 of dummy S-box operations in the series SA2 is equal to 1, and the position of the real access operation in the series SA2 is equal to a logic AND applied bit by bit to the values "001" and "100", which gives "000", corresponding to the first access of the series. Thus, in the example of the series of accesses SA2, the m access operations comprise, in sequence: a real access operation RK2 using the real scrambling key; and a dummy access operation using a random scrambling key FK4. After the last access operation, the output value OUTPUT becomes equal to the result of the real access operations RK2.

The examples of FIGS. 9 and 13 correspond to hardware implementations. In alternative embodiments, the method of performing an S-box access operation described herein could be implemented in software, as will now be described in more detail with reference to FIGS. 6 and 16.

Figure 16:
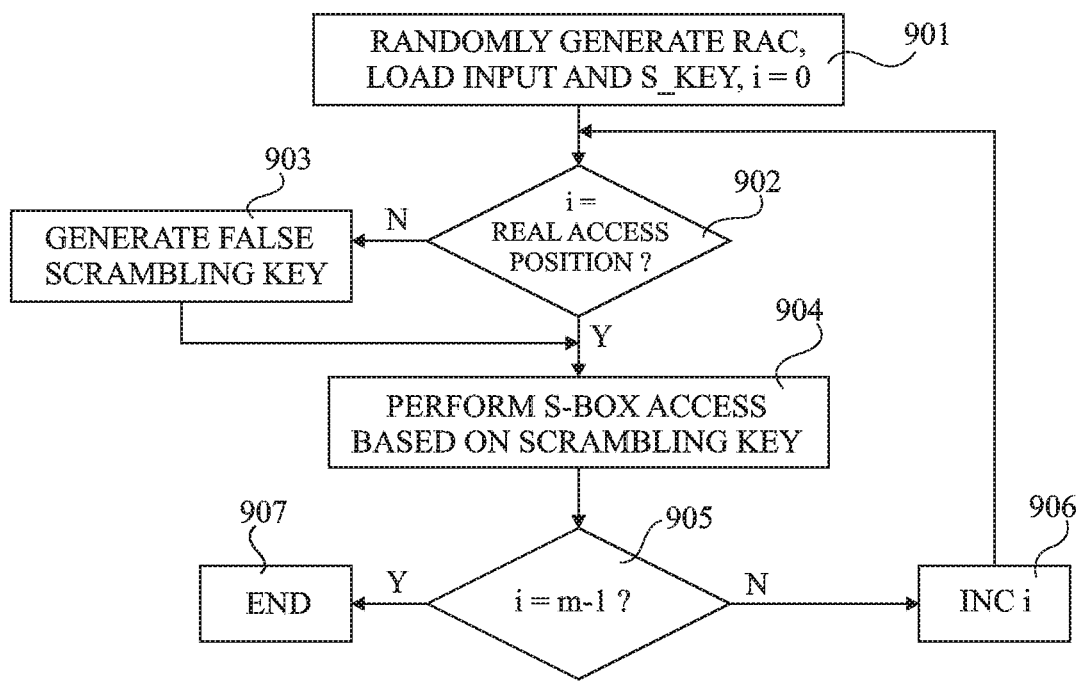
FIG. 16 is a flow diagram representing operations in a method of performing an S-box access according to an example embodiment of the present disclosure.

FIG. 16 is a flow diagram illustrating operations in a method of performing S-box access operations according to an example embodiment of the present disclosure, and using the processing system of FIG. 6, described above.

In an operation 901, the value RAC is randomly generated, for example based on a random value provided by the generator 612. This value is for example stored in the RAM 608. Furthermore, the real scrambling key S_KEY and one or more input values INPUT are for example loaded into the working memory of the processing device 602, the working memory for example corresponding to the RAM 608. The input values are for example the results, stored to the RAM 608, of a previous operation performed by the processing device 602 involving a secret key. Furthermore, a variable i is stored in the RAM 608 and is initialized to 0.

In an operation 902, it is determined whether the variable i is equal to the position of the real access. The position of the real access is for example determined based on the values of RAC, NFC and NF as described above. If the variable i is not equal to the real position, in an operation 903, one or more false scrambling keys are generated by the processing device 602. For example, each false key is derived by the processing device 602 from the real key or generated based on one or more random values provided by the random number generator 612. After operation 903, or after operation 902 in the case that i is equal to the real position in operation 902, the next operation is 904.

In operation 904, the processing device 602 performs a set of one or more S-box accesses based on the scrambling key, which is either the real scrambling key S_KEY, or a false scrambling key if one was generated in operation 903. Each set of one or more S-box accesses is for example performed by addressing one or more non-volatile memories, such as the memory 606, which for example stores a lookup table corresponding to the scrambled S-box. The result of each S-box access is stored to memory, such as to the RAM 608.

In an operation 905, it is determined whether i is equal to m−1. If not, the variable i is incremented in an operation 906, and then the operations 902 to 905 are repeated based on the new value of i. Once i is equal to m−1, the method ends in an operation 907. For example, in the operation 907, the result of the real set of one or more S-box accesses is selected to be used in the cryptographic algorithm, based on the random values RAC and NFC. For example, the processing device 602 selects in the RAM 608, based on the values of the random values RAC and NFC, an address corresponding to the storage location of the result of the real substitution operation.

FIG. 8 schematically illustrates a cryptographic device 800 according to an example embodiment.

The device 800 for example comprises a processing device 802 corresponding to the host processor of the cryptographic device 800. The processing device 802 is for example in communication with a cryptographic circuit 804, which for example corresponds to the circuit 300 of FIG. 9, 11 or 13, or to some or all of the components of the processing system 600 of FIG. 6. The cryptographic device 800 also for example comprises a memory (MEM) 806 and an input/output interface (I/O) 808 in communication with processing device 802.

The device 800 for example corresponds to an integrated circuit card (often known as a "smart card"), portable electronics device or other type of electronics device in which a cryptographic function is to be realized. In some embodiments, the input/output interface 808 may correspond to an NFC (near-field communication) interface.

An advantage of the embodiments described herein is that the discovery of a secret key manipulated during substitution operations of a cryptographic algorithm using side channel methods can be rendered considerably more difficult. Indeed, by performing dummy S-box accesses based on false scrambling keys, a dissymmetry of the leakages is created during each real S-box access, and it becomes very difficult for a meaningful correlation to be determined between side channel signals during the S-box accesses and the value of the secret key.

Furthermore, by using a same set of false scrambling keys for a given secret key, this can lead to the generation of misleading information regarding the key value on the side channels. Indeed, a given false scrambling key used several times for a same secret key can be mistaken for genuine S-box accesses performed based on a ghost key different to the real key. With several different scrambling keys, the number of different ghost keys that will appear to have good correlations can be relatively high, and significantly higher than in the case that a fake secret key and/or fake message is used.

In an embodiment, an advantage of the hardware implementation of FIGS. 9 and 14 is that switching between dummy and real S-box accesses can be performed relatively rapidly, leading to a relatively small time overhead for the additional S-box accesses.

Figure 17:
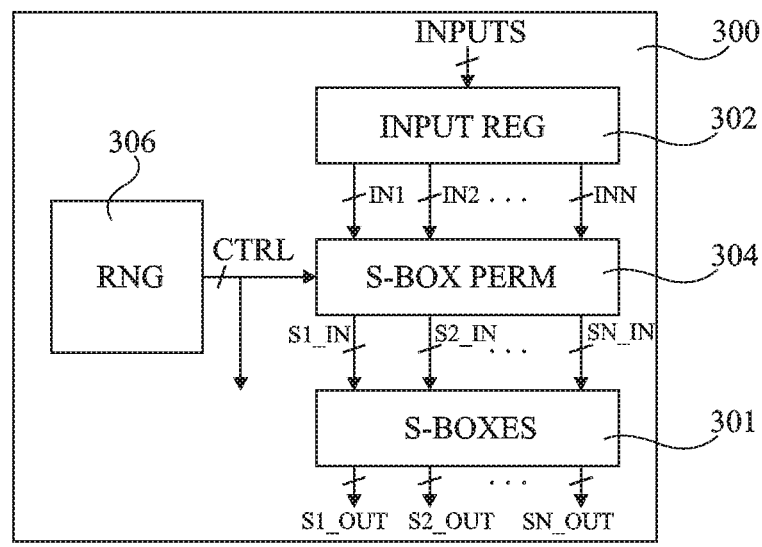
FIG. 17 schematically illustrates a substitution circuit according to an example embodiment of the present disclosure.

FIG. 17 schematically illustrates a substitution circuit 300 for implementing sets of S-box access operations according to an example embodiment of the present disclosure. The circuit 300 for example forms part of the circuit 100 of FIG. 1.

The circuit 300 for example comprises N S-boxes (S-BOXES) 301, which for example correspond to the eight S-boxes of the DES encryption standard. Alternatively, the N S-boxes could correspond to those used in another encryption standard such as in the TDES (triple DES) encryption standard.

Each of the N S-boxes receives a respective input data value S1_IN to SN_IN, and provides a respective output data value S1_OUT to SN_OUT. The S-boxes 301 are for example implemented by one or more non-volatile memories, the respective input data values S1_IN to SN_IN providing address inputs to the one or more memories, and the output data values S1_OUT to SN_OUT corresponding to the data values stored at the addressed memory locations.

The circuit 300 further comprises an input register (INPUT REG) 302 and an S-box permutation circuit (S-BOX PERM) 304. The input register 302 for example receiving N input values INPUTS corresponding to the inputs of a set of substitution operations to be performed in relation with a cryptographic algorithm by the N S-boxes 301. For example, the N input values INPUTS are the result of an operation performed on the message data and the key data of FIG. 1. The register 302 for example provides the N input values IN1 to INN to the S-box permutation circuit 304.

The S-box permutation circuit 304 for example selects the input value to be provided to each of the S-boxes during a given set of substitution operations. For example, the permutation circuit 304 receives a control signals CTRL from a random number generator (RNG) 306 for controlling the selection. The generator 306 is for example a pseudo-random number generator or a true random number generator.

In operation, each real set of S-box access operations defined by the cryptographic algorithm is implemented by a series of m sets of S-box access operations, where m is for example an integer equal to two or more. Only one of the m sets of S-box access operations corresponds to the real set of substitution operations of the cryptographic algorithm. The other m−1 sets of access operations of each series correspond to sets of fake or dummy substitution operations involving different permutations of the S-boxes by the circuit 304. For example, each dummy set of substitution operations for a given series of sets of substitution operations is based on a different permutation from the others.

Figure 18:
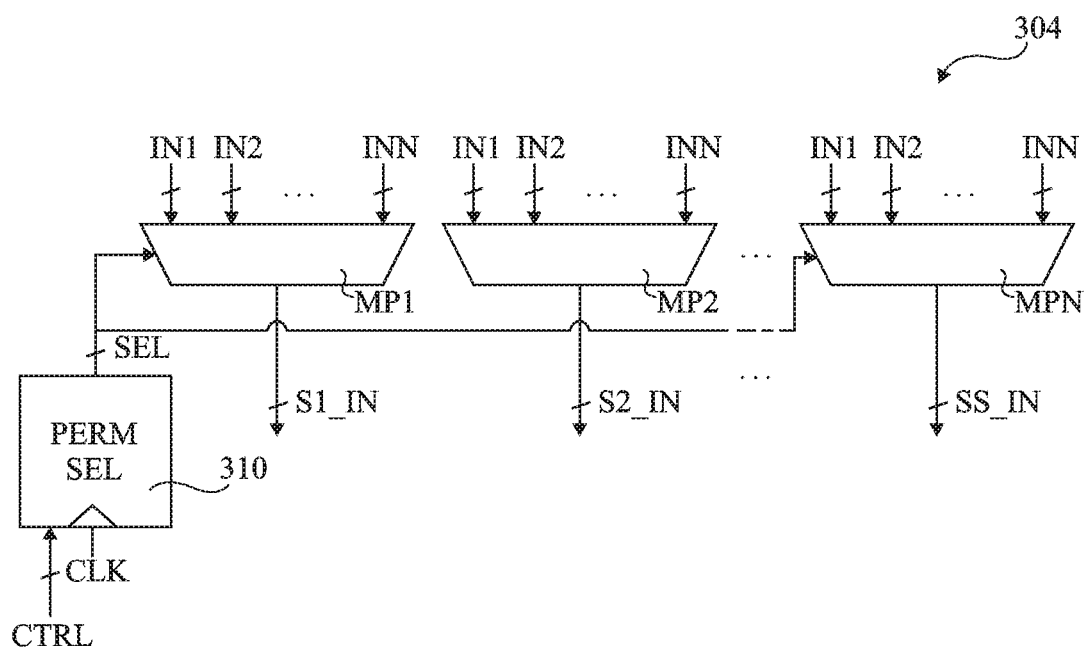
FIG. 18 schematically illustrates a permutation circuit of the substitution circuit of FIG. 17 in more detail according to an example embodiment of the present disclosure.

FIG. 18 schematically illustrates the S-box permutation circuit 304 of FIG. 17 in more detail according to an example embodiment. The circuit 304 for example comprises N multiplexers MP1 to MPN, one associated with each of the N S-boxes. Each of the multiplexers MP1 to MPN receives each of the input values IN1 to INN from the input register 302. Thus any input value can be provided to any S-box. Of course, in the case that only a limited number of permutations are available for selection, each multiplexer MP1 to MPN does not need to receive each input signal IN1 to INN.

The permutation circuit 304 also for example comprises a permutation selection circuit (PERM SEL) 310, which generates a selection signal SEL for controlling the multiplexers MP1 to MPN based on the value of the control signal CTRL provided by the random number generator 306. The permutation selection circuit 310 for example receives a clock signal CLK indicating the period of each set of S-box access operations such that the selection signal SEL can be updated at the appropriate time.

According to one embodiment that will now be described with reference to FIGS. 19 and 20, each set of substitution operations corresponds to all of the substitution operations performed during the execution of a cryptographic algorithm based on a given message and key.

Figure 19:
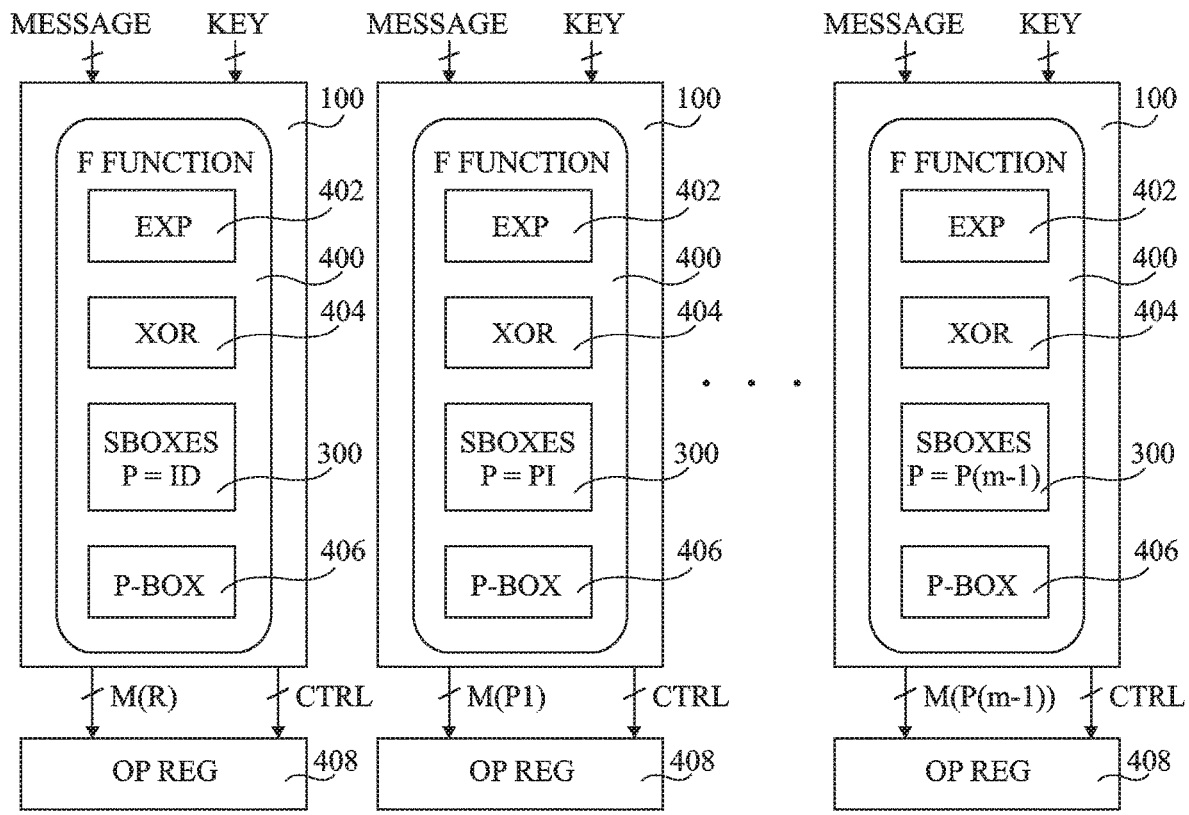
FIG. 19 schematically illustrates a circuit for executing a series of cryptographic operations according to an example embodiment of the present disclosure.

FIG. 19 illustrates the cryptographic circuit 100 of FIG. 1 in more detail for a series of m sets of substitution operations each corresponding to an execution of the DES algorithm based on a given message (MESSAGE) and key (KEY). The cryptographic circuit 100 for example comprises a circuit 400 (F FUNCTION) for executing a round function, each round for example comprising an expansion operation (EXP) performed by a circuit 402, an XOR operation (XOR) performed by a circuit 404 to introduce a round key, the substitution operation performed by the substitution circuit 300, and a permutation operation (P-BOX) performed by a circuit 406. The message resulting from each execution of the DES algorithm is provided to an output register (OP REG) 408, along with the control signal CTRL.

The cryptographic circuit 100 is illustrated multiple times in FIG. 19 to represent the substitution operation performed during each of the series of m executions of the DES algorithm. One of these executions shown on the left in FIG. 19 is based on no permutation of the S-boxes (S-BOXES P=ID), whereas the other executions are respectively based on permutations P1 to P(m−1). The order of the real and fake DES executions is selected randomly for each series of executions based on the randomly generated control signal CTRL.

Figure 20:
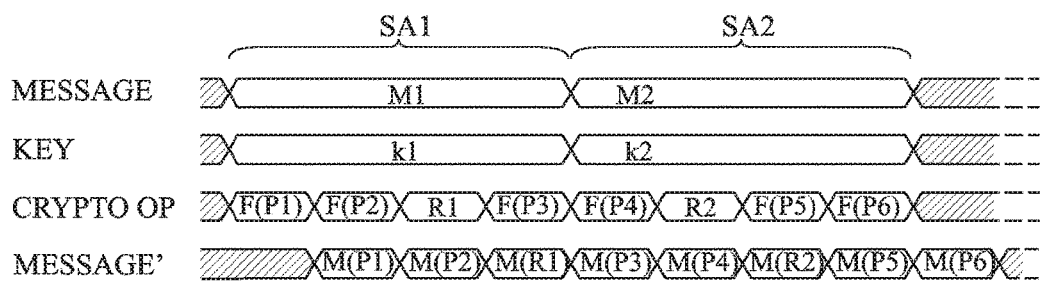
FIG. 20 is a timing diagram illustrating examples of signals in the circuit of FIG. 19 according to an example embodiment.

FIG. 20 is a timing diagram representing an example of the signals MESSAGE and KEY at the input of the circuit 100 of FIG. 19, of the operations performed by the circuit 100, and of the output message (MESSAGE') generated during each execution.

A first series SA1 of DES executions is based on a message M1 and on a key k1 and a second series SA2 of DES executions is based on a message M2 and on a key k2.

In the example of FIG. 19, the number m of DES executions in each series is fixed at four, although in alternative embodiments m could be any integer equal to 2 or more. The series SA1 for example comprises three fake DES executions F(P1), F(P2) and F(P3) respectively based on permutations P1, P2 and P3 of the S-boxes, and a real DES execution R1. The series SA2 for example comprises three fake DES executions F(P4), F(P5) and F(P6) respectively based on permutations P4, P5 and P6 of the S-boxes, and a real DES execution R2. The position of the real DES execution among the fake executions is randomly selected for each series of m executions, and is the third position in the series SA1 and the second position in the series SA2 in the example of FIG. 20.

In some embodiments, the group of permutations in each series of sets of access operations is fixed for a given secret key, and only the position of the real set of access operations varies between the series. Each time the key changes, a new group of permutations is for example selected.

The message MESSAGE' resulting from each execution of the cryptographic algorithm is for example output following the termination of each execution of the cryptographic algorithm, and these messages are for example labelled M(P1) to M(P6) in the case of the fake executions F(P1) to F(P6), and M(R1) and M(R2) in the case of the real executions R1 and R2. During each series of executions, all of the messages are for example stored to the output register 408, and the control signal CTRL is for example used to select only the real messages from the output register 408 to provide the result of the cryptographic algorithm.

Figure 21:
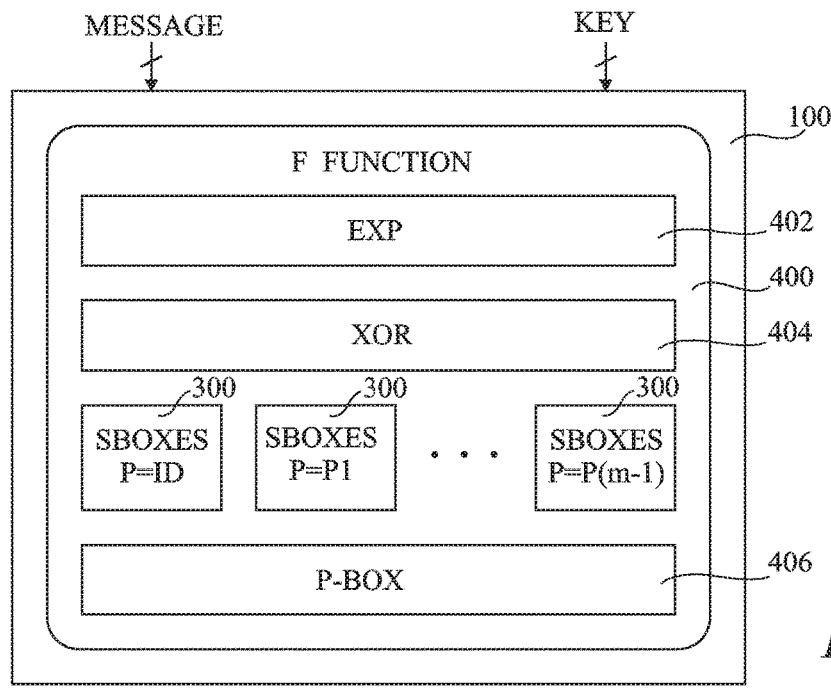
FIG. 21 schematically illustrates a circuit for executing a series of cryptographic operations according to a further example embodiment of the present disclosure.

FIG. 21 illustrates the cryptographic circuit 100 of FIG. 1 in more detail for a series of m sets of substitution operations each corresponding to a single substitution operation accessing a plurality of substitution tables. The example of FIG. 21 is again based on the DES algorithm, and involves the same circuit 400 of FIG. 19. However, in the case of FIG. 21, each time the substitution circuit 104 is called to apply a set of substitution operations within a given execution of the round function, a series of m sets of substitution operations is performed.

The substitution circuit 300 is illustrated multiple times in FIG. 21 to represent the set of substitution operations performed during each of the series of m set of substitution operations. One of these sets of substitution operations is shown on the left in FIG. 21 is based on no permutation of the S-boxes (S-BOXES P=ID), whereas the other sets of substitution operations are respectively based on permutations P1 to P(m−1). The order of the real and fake sets of substitution operations is selected randomly for each series of substitution operations based on the randomly generated control signal CTRL.

Figure 22:
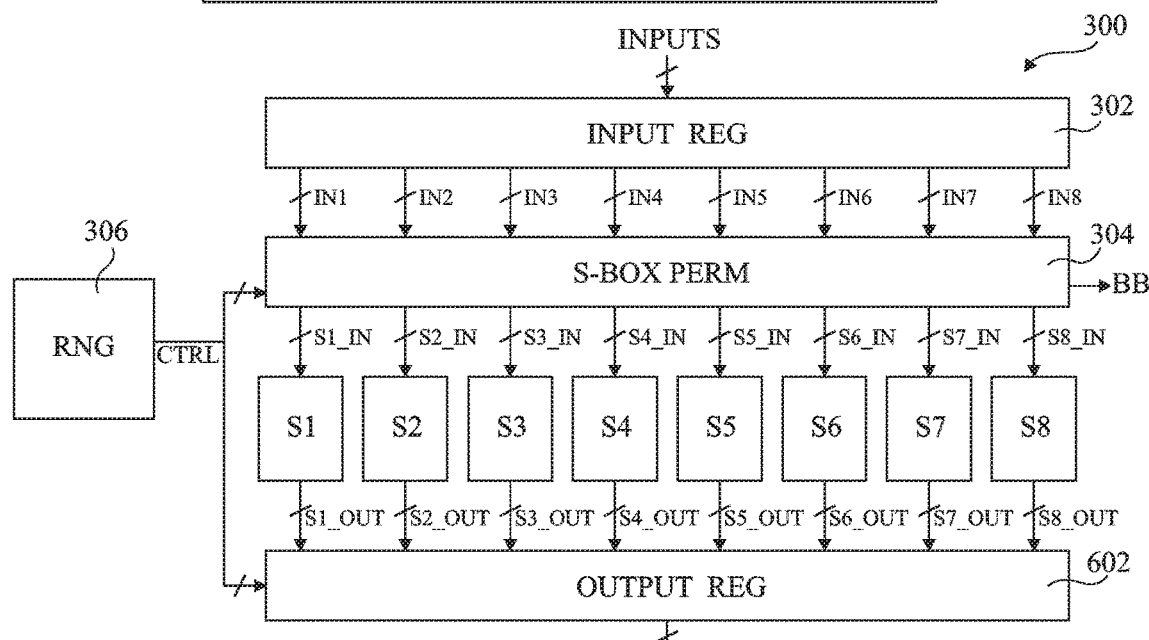
FIG. 22 schematically illustrates a substitution circuit of FIG. 21 in more detail according to an example embodiment of the present disclosure.

FIG. 22 illustrates the substitution circuit 300 in more detail according to an example embodiment. The circuit 300 of FIG. 22 is for example similar to that of FIG. 17, and like features are labelled with like reference numerals and will not be described again in detail. The example of FIG. 21 is based on the eight S-boxes S1 to S8 of the DES standard. The S-box permutation circuit 304 for example generates a busy bit (BB) to indicate to a host system the periods during which the S-boxes are occupied. Furthermore, in the example of FIG. 22, the outputs of the S-boxes are provided to an output register (OUTPUT REG) 602, which also for example receives the control signal CTRL from the generator 306.

In operation, during each set of substitution operations to be performed using the S-boxes S1 to S8, the input data values IN1 to IN8 are loaded into the input register 302, and the selection of the input value to be provided to each S-box during each of the m sets of S-box access operations of the series is based on the value of the control signal CTRL.

For example, in some embodiments, the control signal CTRL comprises random values PERM, RAC and NFC.

The value RAC for example comprises an r-bit value indicating the position of the real sets of substitution operations among the m−1 dummy sets of substitution operations. For example, $2^r$ is equal to m. In one example, m is equal to 4, and r is equal to 2, where a value RAC of "00" indicates the first of the four sets of substitution operations, and a value of RAC of "11" indicates the fourth of the four sets of substitution operations.

The permutations are for example selected randomly based on the random value PERM provided by the generator 306. In some embodiments, the permutations are selected randomly for each of the m−1 dummy sets of access operations in each series. In alternative embodiments, for a given key value k, the particular permutations applied during each of the m−1 sets of dummy access operations are fixed until the key is changed.

The number of possible permutations of the eight S-boxes S1 to S8 in the example of FIG. 22 is equal to 8-factorial, also expressed as 8!, which is equal 40320. Furthermore, each of the m−1 sets of dummy substitution operations of a given series of sets of substitution operations uses a different permutation. Therefore, for a given series of sets of substitution operations, the S-box permutation circuit 304 for example selects both the permutations to be applied, and the order that the permutations are to be applied.

In some embodiments, the permutation circuit 304 is capable of applying a limited group of permutations in a limited number of different orders for the m−1 sets of dummy substitution operations, and the value of PERM is used to randomly select both the permutations and the order of the permutations. An example of the permutation selection based on a 3-bit value of PERM, on a value of m equal to 4, and based on eight available permutations P1 to P8, is provided in the following table for the m−1 sets of dummy substitution operations:

| Value of PERM | Selected permutations and order |
| --- | --- |
| "000" | P1, P2, P3 |
| "001" | P4, P5, P6, |
| "010" | P7, P8, P2 |
| "011" | P4, P6, P8 |
| "100" | P3, P6, P1 |
| "101" | P5, P7, P2 |
| "110" | P8, P5, P1 |
| "111" | P7, P4, P6 |

Furthermore, the value of RAC is used to select the position of the real set of substitution operations with respect to the m−1 dummy sets of substitution operations. Thus, if PERM is equal to "000" and RAC is equal to "11", the m sets of substitutions are for example performed as follows based on the tables above: P1, P2, P3, RA, where RA corresponds to the real set of S-box access operations.

The value NFC for example indicates the number m−1 of dummy sets of substitution operations in each series. In some embodiments, this value may be fixed for a given key, while in other embodiments, this value is randomly generated for each series of sets of substitution operations.

For example, in one embodiment, the value NFC is a 2-bit value, and the value RAC is a 3-bit value. The number m−1 of dummy S-box accesses in each series of S-box accesses is for example equal to:

$$m-1=2^{NFC}-1$$

Thus, with the value of NFC being equal to 0, 1, 2 or 3, the number m−1 of dummy S-box accesses can for example be 0, 1, 3 or 7. Furthermore, the value RAC is for example used to determine the position of the real access by performing a logic AND operation between the 3-bit binary value RAC and a 3-bit binary value FN representing the number m−1.

By randomly generating the value of NFC for each series of S-box accesses, the processing time for each real S-box access will be variable. Thus, as the duration of each S-box access is no longer predictable, the busy bit BB for example indicates to the host processing system the time periods during which the S-boxes 301 is occupied.

The output register 602 for example stores each of the output values S1_OUT to S8_OUT from the S-boxes S1 to S8 during each of the sets of substitution operations of each series. Furthermore, the circuit 602 for example selects the real set of output values to form the output values OUTPUTS based on the value RAC.

Operation of the circuit of FIG. 22 will now be described in more detail with reference to FIG. 23.

Figure 23:
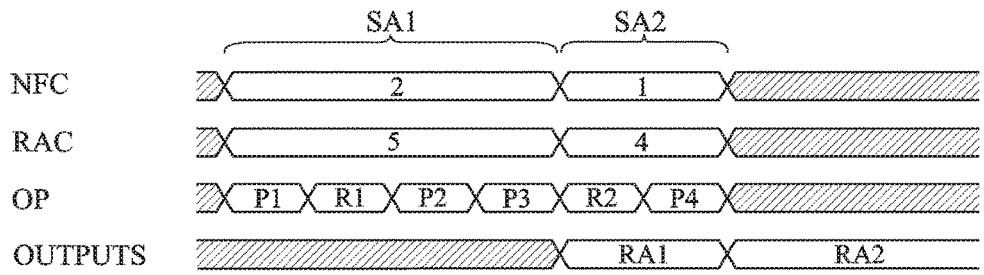
FIG. 23 is a timing diagram illustrating an example of signals in the circuit of FIG. 22.

FIG. 23 is a timing diagram representing examples of the value NFC, the value RAC, the S-box access operations OP, and the output values OUTPUTS, during a series of sets of accesses SA1 and SA2 using the circuit of FIG. 22.

During the series of sets of accesses SA1, the values of NFC and RAC are randomly generated to equal 2 and 5 respectively. Thus, based on the above equation, the number m−1 of dummy sets of S-box operations in the series SA1 is equal to 3. The total number of sets of S-box accesses in any series is equal to m, and the result of the operation NF*RAC is for example a 3-bit value that may assume a value between 0 and NF, where 0 represents the first access of the series, and NF represents the last access of the series. Thus, in the example of the series of accesses SA1, the position of the real access operation is equal to a logic AND applied bit by bit to the values "011" and "101", which gives "001", corresponding to the second access of the series. Thus, in the example of the series of accesses SA1, the position of the real set of access operations is second, and the series SA1 of m sets of access operations comprises, in sequence: a dummy set of access operations using a random permutation P1; a real set of access operations R1; a dummy set of access operations using a random permutation P2; and a dummy set of access operations using a random permutation P3. After the last set of access operations, the output values OUTPUTS become equal to the result of the real set of access operations RA1.

During the series of accesses SA2, the values of NFC and RAC are randomly generated to equal 1 and 4 respectively. Thus the number m−1 of dummy sets of S-box operations in the series SA2 is equal to 1, and the position of the real access operation in the series SA2 is equal to a logic AND applied bit by bit to the values "001" and "100", which gives "000", corresponding to the first access of the series. Thus, in the example of the series of sets of accesses SA2, the m sets of access operations comprise, in sequence: a real set of access operations R2; and a dummy set of access operations using a random permutation P4. After the last set of access operations, the output values OUTPUTS becomes equal to the result of the real set of access operations RA2.

The examples of FIGS. 17, 19 and 21 correspond to hardware implementations. In alternative embodiments, the method of performing a set of S-box access operations described herein could be implemented in software, as will now be described in more detail with reference to FIGS. 6 and 24.

Figure 24:
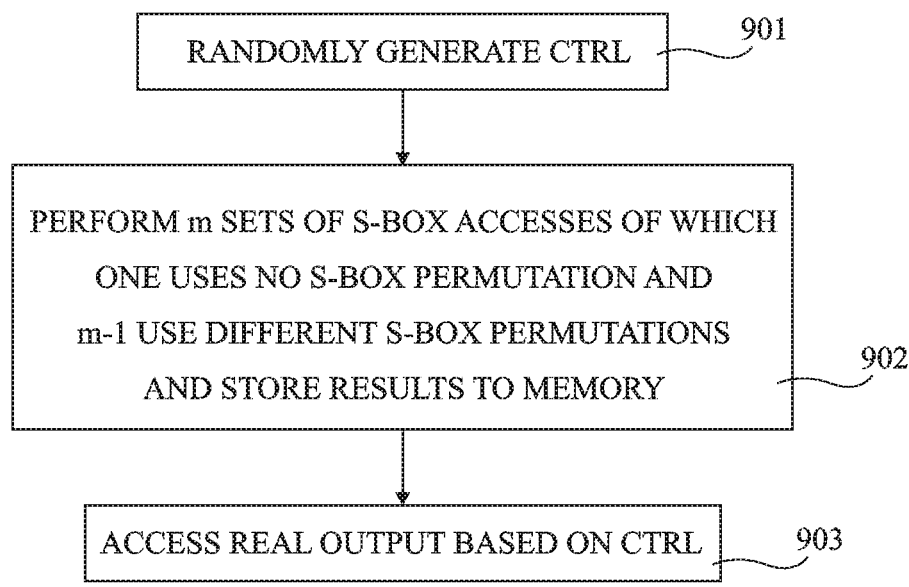
FIG. 24 is a flow diagram representing operations in a method of performing sets of S-box access operations according to an example embodiment of the present disclosure.

FIG. 24 is a flow diagram illustrating operations in a method of performing a set of S-box access operations according to an example embodiment of the present disclosure, and using the processing system of FIG. 6. As described above, each set of S-box access operations may correspond to only the substitution operation itself, or to the substitution operation performed during an entire cryptographic algorithm.

In an operation 901, the random value CTRL is generated, for example based on random values provided by the generator 612. These values are for example stored in the RAM 608.

In an operation 902, the processing device 602 performs m sets of S-box accesses. Each set of S-box accesses for example involves loading N input values into the working memory of the processing device 602, which for example corresponds to the memory 608. One of these sets corresponds to a real set based on S-box accesses as defined by the cryptographic algorithm being executed, without permutation. The remaining m−1 sets of S-box accesses correspond to sets of dummy access operations, in which a permutation is applied by the processing device 602, based on the value CTRL, such that during these S-box accesses, each of the N input values is not provided to its corresponding S-box, but to another S-box based on a random selection. The real set of accesses is randomly positioned with respect to the dummy sets of accesses based on the value CTRL. Each set of S-box accesses is for example performed by addressing one or more non-volatile memories, such as the memory 606, which for example stores a lookup table corresponding to each S-box. The result of each set of S-box accesses is stored to memory, such as to the RAM 608.

While in the hardware implementation of FIG. 22 the S-box accesses of each set are for example performed in parallel in each of the S-boxes S1 to S8, in the case of the software implementation of FIG. 6, the S-box accesses of each set may be performed in parallel if processing resources permit, or may be performed in series.

In operation 904, the results of the real set of S-box accesses are selected to be used in the cryptographic algorithm, based on the signal CTRL. For example, the processing device 602 selects in the RAM 608, based on the values of the random values RAC and NFC of the control signal CTRL, an address corresponding to the storage location of the results of the real set of substitution operations.

FIG. 8 schematically illustrates a cryptographic device 800 according to an example embodiment.

The device 800 for example comprises a processing device (P) 802 corresponding to the host processor of the cryptographic device 800. The processing device 802 is for example in communication with a cryptographic circuit 804, which for example corresponds to the circuit 300 of FIG. 17, 19 or 21, or to some or all of the components of the processing system 600 of FIG. 6. The cryptographic device 800 also for example comprises a memory (MEM) 806 and an input/output interface (I/O) 808 in communication with processing device 802.

The device 800 for example corresponds to an integrated circuit card (often known as a "smart card"), portable electronics device or other type of electronics device in which a cryptographic function is to be realized. In some embodiments, the input/output interface 808 may correspond to an NFC (near-field communication) interface.

An advantage of the embodiments described herein is that the discovery of a secret key manipulated during sets of substitution operations of a cryptographic algorithm using side channel methods may be rendered considerably more difficult. Indeed, by performing dummy sets of S-box accesses based on permutations of the S-boxes, this creates a dissymmetry of the leakages during each real set of S-box accesses, and it becomes very difficult for a meaningful correlation to be determined between side channel signals during the S-box accesses and the value of the secret key.

Furthermore, by using a same group of permutations for a given secret key, this can lead to the generation of misleading information regarding the key value on the side channels. Indeed, a given permutation repeated several times for a same key can be mistaken for genuine S-box accesses performed based on a different ghost key. With several different permutations, the number of different ghost keys that will appear to have good correlations can be relatively high, and significantly higher than in the case that a fake key and/or fake message is used.

An advantage of the hardware implementations of FIGS. 17, 18, 19, 21 and 22 is that switching between dummy and real sets of S-box accesses can be performed relatively rapidly, leading to a relatively small time overhead for the additional sets of S-box accesses.

Having thus described at least one illustrative embodiment, various alterations, modifications and improvements will readily occur to those skilled in the art. For example, it will be apparent to those skilled in the art that the circuit of FIG. 18 implementing the S-box permutation circuit is merely one example, and that many alternative implementations would be possible.

Other embodiments may be employed. For example, in some embodiments, the input register 304 of FIG. 9 or 14, or the input register 302 of FIG. 17, could be replaced by the input circuit 304 of FIG. 3. Additionally or alternatively, the scrambler 306 of FIG. 9 or 14 could be added between the input circuit 304 and the S-BOX 302 of FIG. 3, or between the input register 302 and the permutation circuit 304 of FIG. 17.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    executing, using a cryptographic circuit, a cryptographic process including at least one substitution operation; and
    protecting the cryptographic circuit during execution of the cryptographic process, the protecting including, performing, for each substitution operation of the cryptographic process, a series of substitution operations of which:
        one substitution operation of the series is a real substitution operation corresponding to the substitution operation of the cryptographic process; and
        one or more substitution operations of the series are dummy substitution operations, wherein a position of the real substitution operation in said series of substitution operations is selected randomly, wherein:
        each series of substitution operations comprises a number m of substitution operations, where m is an integer selected randomly for each series; and
        performing each series of substitution operations comprises:
            loading a real input value and N random input values; and
            supplying, on consecutive S-box access operations, the real input value and m−1 of the random input values to an S-box, wherein an order in which the real input value is supplied with respect to the m−1 random input values is randomly selected.

2. The method of claim 1, wherein each substitution operation of the cryptographic process comprises addressing a memory location of a memory based on input data and reading a data value at said memory location to provide output data.

3. The method of claim 1, comprising generating a first random value for a first series of substitution operations, and using the first random value to select the number m of substitution operations in said first series.

4. The method of claim 3, comprising generating a second random value for the first series of substitution operations, and using the second random value to select the position of the real substitution operation in said first series.

5. The method of claim 4, wherein,
    the order in which the real input value is supplied with respect to m−1 random input values for the first series is selected based on the second random value.

6. The method of claim 4, comprising, for each series of substitution operations, storing an output value of each substitution operation, and selecting the output value corresponding to said real substitution operation based on said second random value.

7. A non-transitory computer-readable medium having contents which cause a processing device to perform a method, the method comprising:
- executing a cryptographic process including at least one substitution operation; and
- protecting the processing device during the execution of the cryptographic process, the protecting including performing, for each substitution operation of the cryptographic process, a series of substitution operations of which:
  - one substitution operation of the series is a real substitution operation corresponding to the substitution operation of the cryptographic process; and
  - one or more substitution operations of the series are dummy substitution operations, wherein a position of the real substitution operation in said series of substitution operations is selected randomly, wherein:
  - each series of substitution operations comprises a number m of substitution operations, where m is an integer selected randomly for each series; and
  - performing, each series of substitution operations comprises:
    - loading a real input value and N random input values; and
    - supplying, on consecutive S-box access operations, the real input value and m−1 of the random input values to an S-box wherein an order in which the real input value is supplied with respect to the m−1 random input values is randomly selected.

8. The non-transitory computer-readable medium of claim 7 wherein each substitution operation of the cryptographic process comprises addressing a memory location of a memory based on input data and reading a data value at said memory location to provide output data.

9. The non-transitory computer-readable medium of claim 7, wherein the method comprises generating a first random value for a first series of substitution operations, and using the first random value to select the number m of substitution operations in said first series.

10. The non-transitory computer-readable medium of claim 9 wherein the method comprises generating a second random value for the first series of substitution operations, and using the second random value to select the position of the real substitution operation in said first series.

11. The non-transitory computer-readable medium of claim 10 wherein,
- the order in which the real input value is supplied with respect to m−1 random input values for the first series is selected based on the second random value.

12. The non-transitory computer-readable medium of claim 10 wherein the method comprises, for each series of substitution operations, storing an output value of each substitution operation, and selecting the output value corresponding to said real substitution operation based on said second random value.

13. A cryptographic circuit, comprising:
- a memory circuit, which, in operation, stores one or more substitution tables to implement substitution operations of a cryptographic process; and
- one or more circuits, which, in operation, execute the cryptographic process and protect the cryptographic circuit during execution of the cryptographic process, the executing and protecting including, for each substitution operation of the cryptographic process, performing a series of substitution operations using a stored substitution table, each series of substitution operations comprising:
  - a real substitution operation of the series corresponding to the substitution operation of the cryptographic process; and
  - one or more dummy substitution operations of the series, wherein a position of the real substitution operation in the series of substitution operations is randomly selected, wherein:
  - each series of substitution operations comprises a number m of substitution operations, where m is an integer selected randomly for each series; and
  - performing each series of substitution operations comprises:
    - loading a real input value and N random input values; and
    - supplying, on consecutive S-box access operations, the real input value and m−1 of the random input values to an S-box, wherein an order in which the real input value is supplied with respect to the m−1 random input values is randomly selected.

14. The cryptographic circuit of claim 13, comprising a random number generator, which, in operation, generates, for each of said series, a first random value to randomly select a number of dummy substitution operations to be performed in the series.

15. The cryptographic circuit of claim 14 wherein the random number generator, in operation, generates, for each of said series, a second random value to randomly select the position of the real substitution operation in the series.

16. The cryptographic circuit of claim 13, comprising a memory, which, in operation, stores a result of the substitution operations of said series.

17. The cryptographic circuit of claim 13 wherein the one or more circuits is an S-box input circuit comprising:
- one or more registers, which, in operation, store a real input value corresponding to said real substitution operation and N random input values; and
- one or more multiplexers, which, in operation, select, for each substitution operation of each series, a value among said real input value and said N random input values to form an input to the memory circuit storing said stored substitution table.

18. The cryptographic circuit of claim 17, comprising a selection circuit, which, in operation, generates a selection signal to control the one or multiplexers to perform the selection of said value for each substitution operation of the series.

19. The cryptographic circuit of claim 13 wherein the one or more circuits comprise one or more processing devices under control of instructions stored in an instruction memory to select, for each substitution operation of each series, either said real input value or a random input value to form an input to the memory circuit storing said substitution table.

20. A system comprising:
- one or more processing cores; and
- cryptographic circuitry coupled to the one or more processing cores, wherein the cryptographic circuitry, in operation,
  - executes a cryptographic process including at least one substitution operation; and
  - protects the cryptographic circuitry during the execution of the cryptographic process, the executing and protecting including:

performing, for each substitution operation of the cryptographic process, a series of substitution operations of which:
one substitution operation of the series is a real substitution operation corresponding to the substitution operation of the cryptographic process; and
one or more substitution operations of the series are dummy substitution operations, wherein a position of the real substitution operation in said series of substitution operations is selected randomly, wherein
each series of substitution operations comprises a number m of substitution operations, where m is an integer selected randomly for each series; and
performing each series of substitution operations comprises:
loading a real input value and N random input values, and
supplying, on consecutive ox access operations, the real input value and m−1 of the random input values to an S-box, wherein an order in which the real input value is supplied with respect to the m−1 random input values is randomly selected.

21. The system of claim 20 wherein the cryptographic operation is associated with a function of a processing core of the one or more processing cores.

* * * * *

UNITED STATES PATENT AND TRADEMARK OFFICE
CERTIFICATE OF CORRECTION

PATENT NO. : 11,218,291 B2
APPLICATION NO. : 16/281889
DATED : January 4, 2022
INVENTOR(S) : Thomas Ordas et al.

Page 1 of 1

It is certified that error appears in the above-identified patent and that said Letters Patent is hereby corrected as shown below:

In the Claims

Column 25, Claim 7, Line 23:
"performing, each" should read: -- performing each --.

Column 25, Claim 7, Line 29:
"an S-box wherein" should read: -- an S-box, wherein --.

Column 27, Claim 20, Line 17:
"values, and" should read: -- values; and --.

Column 27, Claim 20, Line 18:
"consecutive ox access" should read: -- consecutive S-box access --.

Signed and Sealed this
Twenty-fourth Day of May, 2022

Katherine Kelly Vidal
*Director of the United States Patent and Trademark Office*